US010771673B2

(12) United States Patent
Tanaka et al.

(10) Patent No.: US 10,771,673 B2
(45) Date of Patent: Sep. 8, 2020

(54) FOCUSING POSITION DETECTING DEVICE AND FOCUSING POSITION DETECTING METHOD

(71) Applicant: FUJIFILM CORPORATION, Minato-ku, Tokyo (JP)

(72) Inventors: Koichi Tanaka, Saitama (JP); Yitong Zhang, Saitama (JP); Tetsuya Fujikawa, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/116,922

(22) Filed: Aug. 30, 2018

(65) Prior Publication Data

US 2018/0376053 A1  Dec. 27, 2018

Related U.S. Application Data

(63) Continuation of application No. PCT/JP2017/007638, filed on Feb. 28, 2017.

(30) Foreign Application Priority Data

Mar. 18, 2016  (JP) ................. 2016-054689

(51) Int. Cl.
*H04N 5/232* (2006.01)
*G02B 7/36* (2006.01)
(Continued)

(52) U.S. Cl.
CPC .......... *H04N 5/23212* (2013.01); *G02B 7/09* (2013.01); *G02B 7/365* (2013.01); *H04N 5/2353* (2013.01)

(58) Field of Classification Search
CPC .... H04N 5/23212; H04N 5/2353; G02B 7/09; G02B 7/365
(Continued)

(56) References Cited

U.S. PATENT DOCUMENTS 5,093,563 A   3/1992 Small et al.
7,659,935 B1  2/2010 Gonsalves
(Continued)

FOREIGN PATENT DOCUMENTS

CN  1503047 A  6/2004
CN  1656354 A  8/2005
(Continued)

OTHER PUBLICATIONS

English language translation of the following: Office action dated May 7, 2019 from the JPO in a Japanese patent application No. 2018-505783 corresponding to the instant patent application.
(Continued)

*Primary Examiner* — Yogesh K Aggarwal
(74) *Attorney, Agent, or Firm* — Solaris Intellectual Property Group, PLLC

(57) ABSTRACT

The focusing position detecting device includes contrast evaluation value calculating unit configured to calculate contrast evaluation values from a plurality of image data items obtained by imaging a subject a multiple number of times at a set exposure time while moving a focus lens in an optical axis direction within a search range, focusing position calculating unit configured to calculate a focusing position from focus positions at the time of imaging the subject a multiple number of times and the contrast evaluation values calculated by the contrast evaluation value calculating unit, detection unit configured to detect atmospheric fluctuation, and exposure time setting unit configured to set an exposure time in a case where the detection unit detects the atmospheric fluctuation so as to be longer than an exposure time in a case where the detection unit does not detect the atmospheric fluctuation.

18 Claims, 10 Drawing Sheets

(51) Int. Cl.
  *G02B 7/09* (2006.01)
  *H04N 5/235* (2006.01)
(58) Field of Classification Search
  USPC .................................. 348/223.1–229.1, 362
  See application file for complete search history.

(56) References Cited

U.S. PATENT DOCUMENTS

| | | | |
|---|---|---|---|
| 2004/0150741 | A1 | 8/2004 | Togawa et al. |
| 2005/0062967 | A1 | 3/2005 | Kobayashi |
| 2008/0316325 | A1* | 12/2008 | Nakahara ........... G06K 9/00255 |
| | | | 348/222.1 |
| 2011/0228074 | A1 | 9/2011 | Parulski et al. |
| 2011/0304752 | A1 | 12/2011 | Lee et al. |
| 2013/0070061 | A1 | 3/2013 | Pan |
| 2014/0210972 | A1 | 7/2014 | On |
| 2014/0362206 | A1 | 12/2014 | Kossin |
| 2015/0199559 | A1* | 7/2015 | Sztuk ................. H04N 5/23219 |
| | | | 348/78 |
| 2015/0346585 | A1 | 12/2015 | Sakurabu |

FOREIGN PATENT DOCUMENTS

| | | |
|---|---|---|
| CN | 101644820 A | 2/2010 |
| CN | 101806987 A | 8/2010 |
| CN | 102281389 A | 12/2011 |
| CN | 102466945 A | 5/2012 |
| CN | 102870044 A | 1/2013 |
| CN | 102893196 A | 1/2013 |
| CN | 103874951 A | 6/2014 |
| CN | 104851106 A | 8/2015 |
| CN | 105190392 A | 12/2015 |
| JP | 2002-329193 A | 11/2002 |
| JP | 2012-029194 A | 2/2012 |
| JP | 2012-042736 A | 3/2012 |
| JP | 2012-182625 A | 9/2012 |
| JP | 2014-191307 A | 10/2014 |
| JP | 2015-115895 A | 6/2015 |
| JP | 2015-177477 A | 10/2015 |
| JP | 2016-051016 A | 4/2016 |
| JP | 2016-206281 A | 12/2016 |
| JP | 2016-218428 A | 12/2016 |

OTHER PUBLICATIONS

International Search Report issued in International Application No. PCT/JP2017/007638 dated Jun. 27, 2017.
Written Opinion of the ISA issued in International Application No. PCT/JP2017/007638 dated Jun. 27, 2017.
English language translation of the following: Office action dated Mar. 25, 2020 from the SIPO in a Chinese patent application No. 201780017400.5 corresponding to the instant patent application.
Liu Xue-chao: "Study on Auto-focusing Based on Digital Image Processing Technology". A Dissertation Submitted to University of Chinese Academy of Sciences in partial fulfillment of the requirement for the degree of Doctor of Science in Engineering, Changchun Institute of Optics, Fine Mechanics and Physics, Chinese Academy of Sciences, Apr. 2014.

* cited by examiner

SCHEMATIC DIAGRAM OF AF SEARCH RANGE

SCHEMATIC DIAGRAM OF AF SEARCH RANGE

FIG. 10
IN CASE WHERE ATMOSPHERIC FLUCTUATION DOES NOT OCCUR
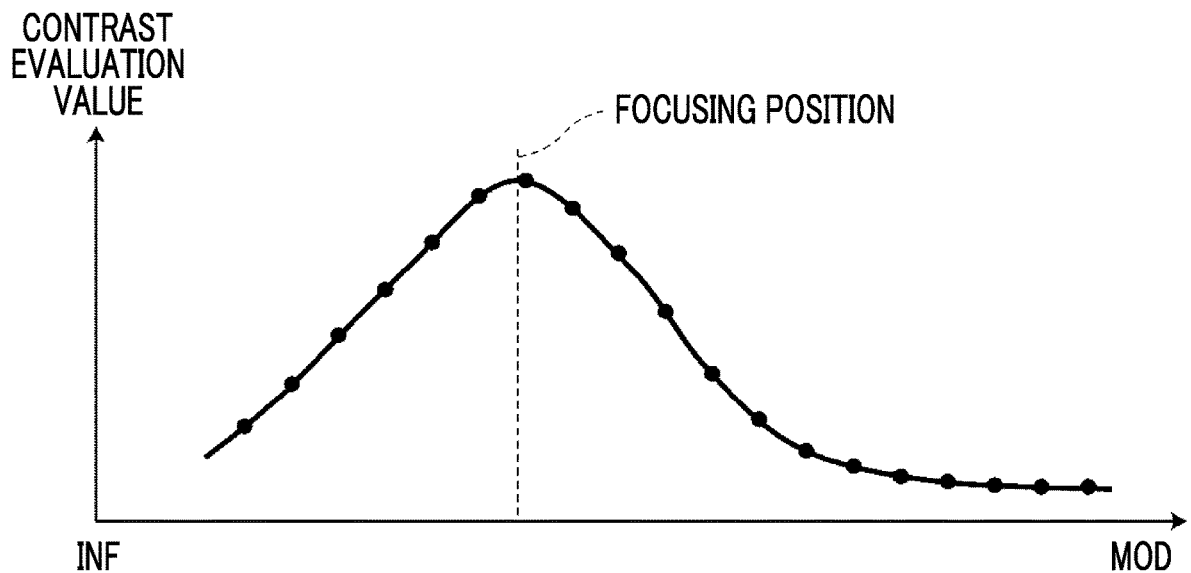
IN CASE WHERE ATMOSPHERIC FLUCTUATION OCCURS
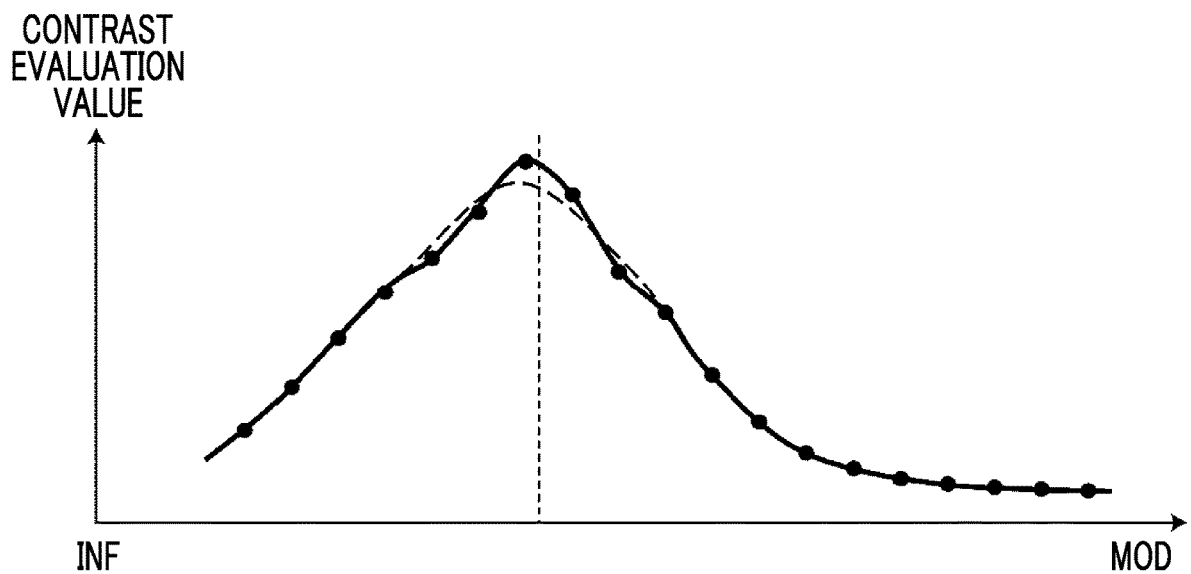
EXAMPLE OF EVALUATION VALUE CURVE

FOCUSING POSITION DETECTING DEVICE AND FOCUSING POSITION DETECTING METHOD

CROSS-REFERENCE TO RELATED APPLICATIONS

This application is a continuation application of International Application No. PCT/JP2017/007638, filed Feb. 28, 2017, the disclosure of which is incorporated herein by reference in its entirety. Further, this application claims priority from Japanese Patent Application No. 2016-054689, filed Mar. 18, 2016, the disclosure of which is incorporated herein by reference in its entirety.

BACKGROUND

1. Technical Field

The present invention relates to a focusing position detecting device and a focusing position detecting method, and particularly, to a focusing position detecting device of a contrast detection type and a focusing position detecting method which are capable of accurately finding a focusing position in a situation in which atmospheric fluctuation such as heat haze occurs.

2. Related Art

In the related art, in a case where a subject is captured in a situation in which atmospheric fluctuation occurs such as a case where heat haze occurs or wind blows, a case where a star in the night sky is captured, or a case where there is an extreme temperature difference near a gas stove, a case where a subject image within an image is blurred due to the influence of the atmospheric fluctuation or a shape of the subject image is distorted has been known. JP2015-177477A suggests a technology in which an image is captured at an exposure time of a short time during which heat haze is not changed within an exposure time in order to suppress the blurring of an image on the captured image. JP2012-182625A suggests a technology in which in a case where the captured image is distorted by air fluctuation, the distortion is corrected by imaging the same subject a multiple number of times and averaging a plurality of captured images.

Meanwhile, in the related art, an autofocusing (hereinafter, referred to as "autofocus (AF)") mechanism for causing an imaging lens to be focused on a predetermined subject is widely applied in an imaging device such as a digital still camera or a digital video camera. A so-called active method of measuring a distance from the subject by irradiating the subject with infrared rays from the imaging device, reflecting the infrared rays from the subject, and detecting an angle of the infrared rays returned to the imaging device and setting the imaging lens in a position focused on an object present in a position of the measured distance, or a so-called passive method of detecting a focusing state by processing image signals output from imaging means of the imaging device and setting the imaging lens in a position in which a best focusing state is obtained has been known as this kind of AF mechanism.

A phase detection method of determining a focusing state from a laterally deviated amount of an image and a contrast detection method of determining a focusing state from the contrast of an image have been known as the AF mechanism of the passive method. The AF mechanism of the contrast detection method calculates contrast evaluation values from a plurality of image data items obtained by intermittently imaging the subject and calculates the focusing position with a position in which the calculated contrast evaluation value is highest, that is, a peak value as a reference while moving the imaging lens within an operation range for focusing the imaging lens, that is, within a search range. Specifically, a focusing position corresponding to a peak value of the contrast evaluation value is calculated through interpolation calculation based on a focusing position in which the contrast evaluation value is maximized, a plurality of focusing positions present before and after this focusing position, and contrast evaluation values corresponding to these focusing positions.

SUMMARY

Hereinafter, FIG. 10 shows an example of evaluation value curves. The upper diagram of FIG. 10 is an evaluation value curve in a case where atmospheric fluctuation does not occur, and the lower diagram of FIG. 10 is an evaluation value curve in a case where the atmospheric fluctuation occurs. The evaluation value curve is a graph in which a lateral axis depicts a focusing position and a vertical axis depicts a contrast evaluation value. The evaluation value curve represented by a dotted line in the lower diagram of FIG. 10 is provided for comparison, and shows the evaluation value curve represented by a solid line in the upper diagram of FIG. 10. A minimum object distance (MOD) at the lateral axis represents a distance with which imaging is able to be performed in a position closest to the subject, that is, the shortest imaging distance, and infinity (INF) represents a distance with which the subject is very far away, that is, a distance of infinity.

In the AF mechanism of the contrast detection method, in a case where the exposure time is set as the same time, a change in contrast evaluation values caused by the fluctuation of the subject image is added to a variation in the contrast evaluation values caused by a change in focusing position of the imaging lens in the evaluation value curve in a case where the atmospheric fluctuation occurs which is shown in the lower diagram of FIG. 10, compared to the evaluation value curve in a case where the atmospheric fluctuation does not occur which is shown in the upper diagram of FIG. 10. Thus, a shape of the evaluation value curve is in disorder.

As stated above, since the focusing position is calculated through interpolation calculation based on a focusing position in which the contrast evaluation value is maximized, a plurality of focusing positions present before and after this focusing position, and contrast evaluation values corresponding to these focusing positions, in a case where the evaluation value curve is in disorder as shown in the lower diagram of FIG. 10, the contrast evaluation value near the peak is in disorder, and thus, there are some cases where an accurate focusing position is not found.

JP2015-177477A discloses a technology in which the image is captured at the exposure time of the short time during which the heat haze is not changed within the exposure time. However, in the AF mechanism of the contrast detection method, in a case where the exposure time is shortened, a shape difference of the subject image between the captured image data items becomes larger, and the variation in the calculated contrast evaluation value is increased. Thus, there are some cases where the accurate focusing position is not found. JP2012-182625A discloses that the same subject is captured a multiple number of times and the distortion is corrected by averaging the plurality of captured images, but does not describe the AF mechanism of the contrast detection method.

The present invention has been made in view of such circumstances, and an object of the present invention is to provide a focusing position detecting device of a contrast detection type and a focusing position detecting method which are capable of accurately finding a focusing position even in a situation in which atmospheric fluctuation occurs.

A first focusing position detecting device according to the present invention comprises contrast evaluation value calculating unit configured to calculate contrast evaluation values from a plurality of image data items obtained by imaging a subject a multiple number of times at a set exposure time while moving a focus lens in an optical axis direction within a search range, and focusing position calculating unit configured to calculate a focusing position from focus positions at the time of imaging the subject a multiple number of times and the contrast evaluation values calculated by the contrast evaluation value calculating unit. The device comprises detection unit configured to detect atmospheric fluctuation, and exposure time setting unit configured to set an exposure time in a case where the detection unit detects the atmospheric fluctuation so as to be longer than an exposure time in a case where the detection unit does not detect the atmospheric fluctuation.

In the present invention, the "detection unit" may automatically detect the atmospheric fluctuation, or whether or not there is the atmospheric fluctuation may be manually input by the user.

The first focusing position detecting device according to the present invention may further comprise standard contrast evaluation value calculating unit configured to calculate contrast evaluation values from a plurality of image data items obtained by imaging the subject a multiple number of times at an exposure time in a case where the atmospheric fluctuation is not detected while moving the focus lens in the optical axis direction within a first search range, first focusing position calculating unit configured to calculate a first focusing position from focus positions at the time of imaging the subject a multiple number of times by the standard contrast evaluation value calculating unit and the contrast evaluation values calculated by the standard contrast evaluation value calculating unit, fluctuation contrast evaluation value calculating unit configured to calculate contrast evaluation values from a plurality of image data items obtained by imaging the subject a multiple number of times at an exposure time in a case where the detection unit detects the atmospheric fluctuation while moving the focus lens within a second search range which includes the first focusing position and is narrower than the first search range in the optical axis direction in a case where the detection unit detects the atmospheric fluctuation, and second focusing position calculating unit configured to calculate a focusing position from focus positions at the time of imaging the subject a multiple number of times by the fluctuation contrast evaluation value calculating unit and the contrast evaluation values calculated by the fluctuation contrast evaluation value calculating unit.

In the present invention, the "standard contrast evaluation value calculating unit" is unit configured to calculate the contrast evaluation values from the image data items obtained through the imaging using the exposure time in a case where the atmospheric fluctuation is not detected, and the "fluctuation contrast evaluation value calculating unit" is unit configured to calculate the contrast evaluation values from the image data items obtained through the imaging using the exposure time in a case where the atmospheric fluctuation is detected.

In the first focusing position detecting device according to the present invention, a search width in the fluctuation contrast evaluation value calculating unit may be shorter than a search width in the standard contrast evaluation value calculating unit.

In the present invention, the "search width" means an imaging interval in a case where the subject is captured a multiple number of times.

A second focusing position detecting device according to the present invention comprises first contrast evaluation value calculating unit configured to calculate contrast evaluation values from a plurality of image data items obtained by imaging a subject a multiple number of times at a set exposure time while moving a focus lens in an optical axis direction within a first search range, first focusing position calculating unit configured to calculate a first focusing position from focus positions at the time of imaging the subject a multiple number of times and the calculated contrast evaluation values in the first contrast evaluation value calculating unit, drive unit configured to drive the focus lens in the first focusing position, second contrast evaluation value calculating unit configured to calculate contrast evaluation values from a plurality of image data items obtained by imaging the subject a multiple number of times at the set exposure time in the first focusing position, time variation detecting unit configured to detect a time variation in a plurality of the contrast evaluation values calculated by the second contrast evaluation value calculating unit, determination unit configured to determine whether or not the contrast evaluation values are influenced by atmospheric fluctuation from the detection result of the time variation, exposure time setting unit configured to set an exposure time so as to be longer than the set exposure time in a case where it is determined that the contrast evaluation values are influenced by the atmospheric fluctuation, third contrast evaluation value calculating unit configured to calculate contrast evaluation values from a plurality of image data items obtained by imaging the subject a multiple number of times at the exposure time set by the exposure time setting unit while moving the focus lens within a second search range which includes the first focusing position and is narrower than the first search range in the optical axis direction in a case where it is determined that the contrast evaluation values are influenced by the atmospheric fluctuation, and second focusing position calculating unit configured to calculate a second focusing position from focus positions at the time of imaging the subject a multiple number of times and the calculated contrast evaluation values in the third contrast evaluation value calculating unit.

In the first focusing position detecting device and the second focusing position detecting device according to the present invention, a central position of the second search range may be set in the first focusing position.

In the second focusing position detecting device according to the present invention, a search width in the third contrast evaluation value calculating unit may be shorter than a search width in the second contrast evaluation value calculating unit.

A first focusing position detecting method according to the present invention comprises a contrast evaluation value calculating step of calculating contrast evaluation values from a plurality of image data items obtained by imaging a subject a multiple number of times at a set exposure time while moving a focus lens in an optical axis direction within a search range, and a focusing position calculating step of calculating a focusing position from focus positions at the time of imaging the subject a multiple number of times and the calculated contrast evaluation values, the method comprising, a detection step of detecting atmospheric fluctuation, and an exposure time setting step of setting an exposure time in a case where the atmospheric fluctuation is detected so as to be longer than an exposure time in a case where the atmospheric fluctuation is not detected.

In the present invention, the atmospheric fluctuation may be automatically detected in the "detection step", or whether or not there is the atmospheric fluctuation may be manually input by the user.

The first focusing position detecting method according to the present invention may further comprise a standard contrast evaluation value calculating step of calculating contrast evaluation values from a plurality of image data items obtained by imaging the subject a multiple number of times at an exposure time in a case where the atmospheric fluctuation is not detected while moving the focus lens in the optical axis direction within a first search range, a first focusing position calculating step of calculating a first focusing position from focus positions at the time of imaging the subject a multiple number of times in the standard contrast evaluation value calculating step and the calculated contrast evaluation values, a fluctuation contrast evaluation value calculating step of calculating contrast evaluation values from a plurality of image data items obtained by imaging the subject a multiple number of times at an exposure time in a case where the atmospheric fluctuation is detected while moving the focus lens within a second search range which includes the first focusing position and is narrower than the first search range in the optical axis direction in a case where the atmospheric fluctuation is detected, and a second focusing position calculating step of calculating a second focusing position from focus positions at the time of imaging the subject a multiple number of times in the fluctuation contrast evaluation value calculating step and the calculated contrast evaluation values.

In the present invention, the "standard contrast evaluation value calculating step" is a step of calculating the contrast evaluation values from the image data items obtained through the imaging using the exposure time in a case where the atmospheric fluctuation is not detected, and the "fluctuation contrast evaluation value calculating step" is a step of calculating the contrast evaluation values from the image data items obtained through the imaging using the exposure time in a case where the atmospheric fluctuation is detected.

In the first focusing position detecting method according to the present invention, a search width in the fluctuation contrast evaluation value calculating step may be shorter than a search width in the standard contrast evaluation value calculating step.

A second focusing position detecting method according to the present invention comprises a first contrast evaluation value calculating step of calculating contrast evaluation values from a plurality of image data items obtained by imaging a subject a multiple number of times at a set exposure time while moving a focus lens in an optical axis direction within a first search range, a first focusing position calculating step of calculating a first focusing position from focus positions at the time of imaging the subject a multiple number of times and the calculated contrast evaluation values in the first contrast evaluation value calculating step, a drive step of driving the focus lens in the first focusing position, a second contrast evaluation value calculating step of calculating contrast evaluation values from a plurality of image data items obtained by imaging the subject a multiple number of times at the set exposure time in the first focusing position, a time variation detecting step of detecting a time variation in a plurality of the contrast evaluation values calculated in the second contrast evaluation value calculating step, a determination step of determining whether or not the contrast evaluation values are influenced by atmospheric fluctuation from the detection result of the time variation, an exposure time setting step of setting an exposure time so as to be longer than the set exposure time in a case where it is determined that the contrast evaluation values are influenced by the atmospheric fluctuation, a third contrast evaluation value calculating step of calculating contrast evaluation values from a plurality of image data items obtained by imaging the subject a multiple number of times at the exposure time set in the exposure time setting step while moving the focus lens within a second search range which includes the first focusing position and is narrower than the first search range in the optical axis direction in a case where it is determined that the contrast evaluation values are influenced by the atmospheric fluctuation, and a second focusing position calculating step of calculating a second focusing position from focus positions at the time of imaging the subject a multiple number of times and the calculated contrast evaluation values in the third contrast evaluation value calculating step.

In the first focusing position detecting method and the second focusing position detecting method according to the present invention, a central position of the second search range may be set in the first focusing position.

In the second focusing position detecting method according to the present invention, a search width in the third contrast evaluation value calculating step may be shorter than a search width in the second contrast evaluation value calculating step.

In accordance with the first focusing position detecting device and the first focusing position detecting method according to the present invention, the focusing position detecting device includes contrast evaluation value calculating unit configured to calculate contrast evaluation values from a plurality of image data items obtained by imaging a subject a multiple number of times at a set exposure time while moving a focus lens in an optical axis direction within a search range, focusing position calculating unit configured to calculate a focusing position from focus positions at the time of imaging the subject a multiple number of times and the contrast evaluation values calculated by the contrast evaluation value calculating unit, detection unit configured to detect atmospheric fluctuation, and exposure time setting unit configured to set an exposure time in a case where the detection unit detects the atmospheric fluctuation so as to be longer than an exposure time in a case where the detection unit does not detect the atmospheric fluctuation. Accordingly, in a case where the atmospheric fluctuation occurs, the subject image is not vivid in the plurality of obtained image data items. However, since the image data items are time-averaged and the subject image becomes an image having no fluctuation, it is possible to decrease the shape difference of the subject image between the image data items. Thus, it is possible to reduce the variation of the contrast evaluation values caused by the fluctuation of the subject image, and thus, it is possible to more accurately calculate the focusing position.

In accordance with the first focusing position detecting method according to the present invention, the focusing position detecting method includes a contrast evaluation value calculating step of calculating contrast evaluation values from a plurality of image data items obtained by imaging a subject a multiple number of times at a set exposure time while moving a focus lens in an optical axis direction within a search range, a focusing position calculating step of calculating a focusing position from focus positions at the time of imaging the subject a multiple number of times and the calculated contrast evaluation values, a detection step of detecting atmospheric fluctuation, and an exposure time setting step of setting an exposure time in a case where the atmospheric fluctuation is detected so as to be longer than an exposure time in a case where the atmospheric fluctuation is not detected. Accordingly, in a case where the atmospheric fluctuation occurs, the subject image is not vivid in the plurality of obtained image data items. However, since the image data items are time-averaged and the subject image becomes an image having no fluctuation, it is possible to decrease the shape difference of the subject image between the image data items. Thus, it is possible to reduce the variation of the contrast evaluation values caused by the fluctuation of the subject image, and thus, it is possible to more accurately calculate the focusing position.

In accordance with the second focusing position detecting device according to the present invention, the focusing position detecting device includes first contrast evaluation value calculating unit configured to calculate contrast evaluation values from a plurality of image data items obtained by imaging a subject a multiple number of times at a set exposure time while moving a focus lens in an optical axis direction within a first search range, first focusing position calculating unit configured to calculate a first focusing position from focus positions at the time of imaging the subject a multiple number of times and the calculated contrast evaluation values in the first contrast evaluation value calculating unit, drive unit configured to drive the focus lens in the first focusing position, second contrast evaluation value calculating unit configured to calculate contrast evaluation values from a plurality of image data items obtained by imaging the subject a multiple number of times at the set exposure time in the first focusing position, time variation detecting unit configured to detect a time variation in the plurality of contrast evaluation values calculated by the second contrast evaluation value calculating unit, determination unit configured to determine whether or not the contrast evaluation values are influenced by atmospheric fluctuation from the detection result of the time variation, exposure time setting unit configured to set an exposure time so as to be longer than the set exposure time in a case where it is determined that the contrast evaluation values are influenced by the atmospheric fluctuation, third contrast evaluation value calculating unit configured to calculate contrast evaluation values from a plurality of image data items obtained by imaging the subject a multiple number of times at the exposure time set by the exposure time setting unit while moving the focus lens within a second search range which includes the first focusing position and is narrower than the first search range in the optical axis direction in a case where it is determined that the contrast evaluation values are influenced by the atmospheric fluctuation, and second focusing position calculating unit configured to calculate a second focusing position from focus positions at the time of imaging the subject a multiple number of times and the calculated contrast evaluation values in the third contrast evaluation value calculating unit. Thus, only in a case where the calculated contrast evaluation values are influenced by the atmospheric fluctuation, the AF search is performed again, and unnecessary AF search is not performed. Accordingly, it is possible to reduce a time required for AF search.

In accordance with the second focusing position detecting method according to the present invention, the focusing position detecting method includes a first contrast evaluation value calculating step of calculating contrast evaluation values from a plurality of image data items obtained by imaging a subject a multiple number of times at a set exposure time while moving a focus lens in an optical axis direction within a first search range, a first focusing position calculating step of calculating a first focusing position from focus positions at the time of imaging the subject a multiple number of times and the calculated contrast evaluation values in the first contrast evaluation value calculating step, a drive step of driving the focus lens in the first focusing position, a second contrast evaluation value calculating step of calculating contrast evaluation values from a plurality of image data items obtained by imaging the subject a multiple number of times at the set exposure time in the first focusing position, a time variation detecting step of detecting a time variation in the plurality of contrast evaluation values calculated in the second contrast evaluation value calculating step, a determination step of determining whether or not the contrast evaluation values are influenced by atmospheric fluctuation from the detection result of the time variation, an exposure time setting step of setting an exposure time so as to be longer than the set exposure time in a case where it is determined that the contrast evaluation values are influenced by the atmospheric fluctuation, a third contrast evaluation value calculating step of calculating contrast evaluation values from a plurality of image data items obtained by imaging the subject a multiple number of times at the exposure time set in the exposure time setting step while moving the focus lens within a second search range which includes the first focusing position and is narrower than the first search range in the optical axis direction in a case where it is determined that the contrast evaluation values are influenced by the atmospheric fluctuation, and a second focusing position calculating step of calculating a second focusing position from focus positions at the time of imaging the subject a multiple number of times and the calculated contrast evaluation values in the third contrast evaluation value calculating step. Thus, only in a case where the calculated contrast evaluation values are influenced by the atmospheric fluctuation, the AF search is performed again, and unnecessary AF search is not performed. Accordingly, it is possible to reduce a time required for AF search.

BRIEF DESCRIPTION OF THE DRAWINGS

FIG. 10 is a diagram showing evaluation value curves in a case where atmospheric fluctuation occurs and in a case where the atmospheric fluctuation does not occur.

DETAILED DESCRIPTION

Hereinafter, embodiments of the present invention will be described with reference to the drawings. An example in which a digital camera is used as an electronic device including a focusing position detecting device according to a first embodiment of the present invention will be described in the following embodiment, but the application range according to the present invention is not limited thereto. For example, the present invention may be applied to another electronic device having an electronic imaging function, such as a digital video camera, a mobile phone with a camera, or a personal data assistant (PDA) with a camera such as a media player, a tablet terminal, or a smartphone. For example, the focusing position detecting device according to the present invention may be provided on an operation terminal such as a personal computer connected to the electronic device having the electronic imaging function in a wireless or wired manner.

Figure 1:
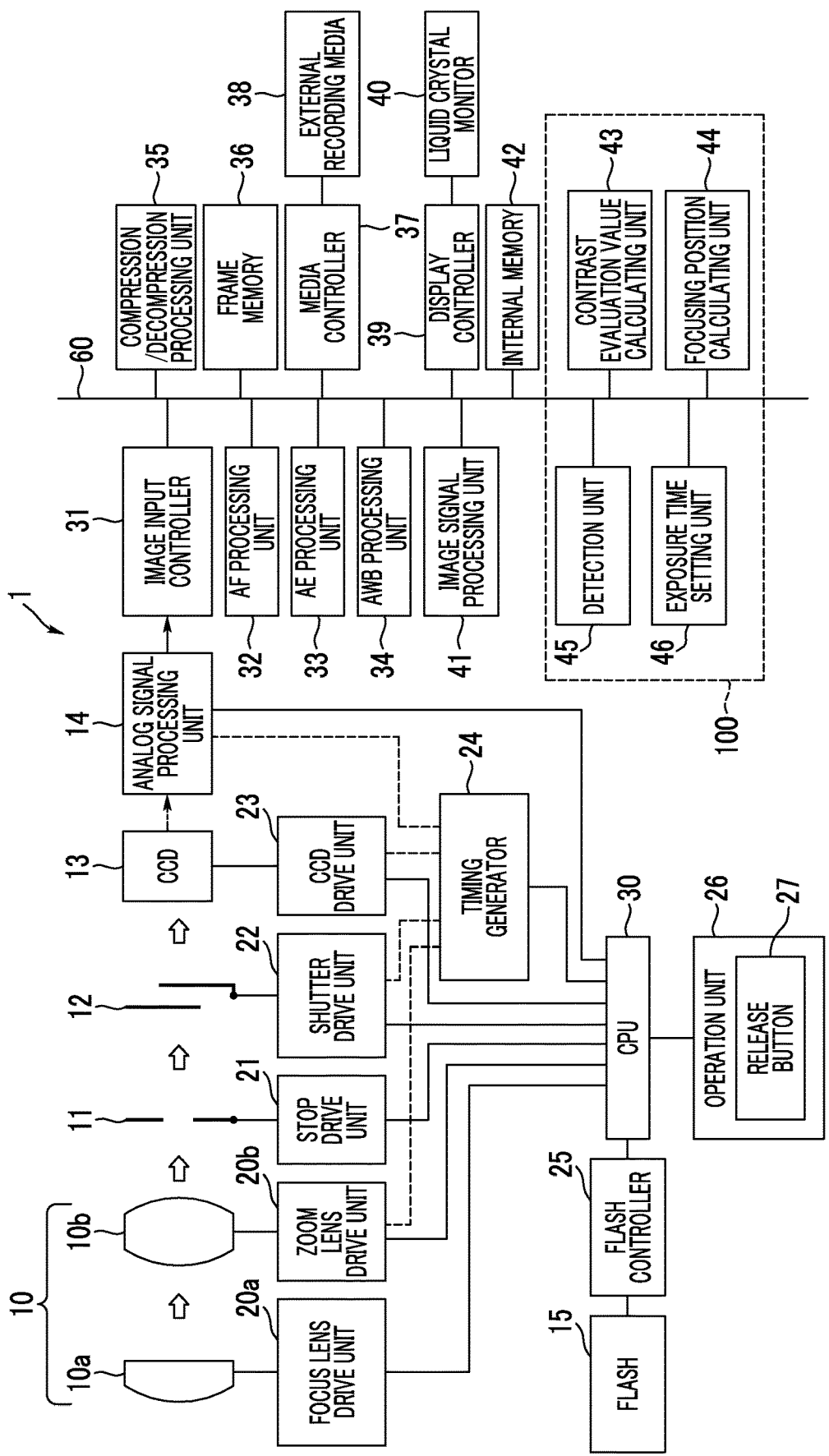
FIG. 1 is a block diagram of a digital camera including a focusing position detecting device according to a first embodiment of the present invention.

FIG. 1 shows a block diagram showing a functional configuration of a digital camera 1. As shown in FIG. 1, the digital camera 1 according to the present embodiment is provided with an operation unit 26 as an operation system of the digital camera 1 which transmits the operation contents to a CPU 30, such as a release button 27, a menu/OK button, and zoom/up-down arrow buttons (not shown).

An imaging lens 10 forms a subject image on a predetermined image forming surface (imaging element within a camera main body), and the imaging lens 10 is composed of a focus lens 10a and a zoom lens 10b. These lenses are respectively step-driven by a focus lens drive unit 20a and a zoom lens drive unit 20b which each include a motor and a motor driver, and are movable in an optical axis direction. The focus lens drive unit 20a step-drives the focus lens 10a based on focus driving amount data output from an AF processing unit 32 to be described below. The zoom lens drive unit 20b controls the step driving of the zoom lens 10b based on operation amount data of the zoom/up-down arrow buttons (operation unit 26).

A stop 11 is driven by a stop drive unit 21 which includes a motor and a motor driver. The stop drive unit 21 adjusts a stop diameter of the stop 11 based on F number data output from an AE processing unit 33 to be described below.

The shutter 12 is a mechanical shutter, and is driven by a shutter drive unit 22 which includes a motor and a motor driver. The shutter drive unit 22 controls the opening and closing of the shutter 12 in response to a signal generated by pushing the release button 27 and shutter speed data output from the AE processing unit 33.

A charge-coupled device (CCD) 13 which is an imaging element is provided behind the optical system. The CCD 13 has a photoelectric surface on which a plurality of light-receiving elements is disposed in a matrix shape. Subject light passed through the optical system is formed as an image on the photoelectric surface, and is photoelectrically converted. A microlens array (not shown) for converging light on each pixel and a color filter array (not shown) in which RGB color filters are regularly disposed are disposed in front of the photoelectric surface.

The CCD 13 reads out electric charges accumulated in each pixel in synchronization with a vertical electric charge transfer clock signal and a horizontal electric charge transfer clock signal supplied from a CCD drive unit 23 line by line, and outputs the readout electric charges as serial analog image signals. An accumulation time of the electric charges in each pixel, that is, an exposure time is determined by an electronic shutter drive signal given from the CCD drive unit 23.

The analog image signals output from the CCD 13 are input to an analog signal processing unit 14. The analog signal processing unit 14 includes a sampling two correlation pile circuit that removes the noise of the analog image signals, an auto gain controller that adjusts the gain of the analog image signals, and an analog/digital converter (A/D converter) that converts the analog image signals into digital image data. The digital image data converted into digital signals is CCD-RAW data having density values of RGB (Red, Green, Blue) for each pixel.

A timing generator 24 generates a timing signal. The timing signal is input to the shutter drive unit 22, the CCD drive unit 23, and the analog signal processing unit 14, and thus, the synchronization of the operation of the release button 27, the opening and closing of the shutter 12, the introduction of the electric charges of the CCD 13, and the processing of the analog signal processing unit 14 is achieved.

A flash 15 instantaneously irradiates the subject with light necessary for imaging for a period during which the release button 27 is pushed and the shutter 12 is opened. A flash controller 25 controls an emission operation of the flash 15.

An image input controller 31 writes the CCD-RAW data input from the analog signal processing unit 14 in a frame memory 36. The frame memory 36 is a work memory used in a case where various digital image processing (signal processing) to be described below is performed on image data. For example, a synchronous dynamic random access memory (SDRAM) that transfers data in synchronization with a bus clock signal having a predetermined cycle is used.

A display controller 39 displays the image data stored in the frame memory 36 as a live preview image on a liquid crystal monitor 40. For example, the display controller converts a luminance (Y) signal and a color (C) signal into a composite signal as one signal, and outputs the composite signal to the liquid crystal monitor 40. The live preview image is obtained at predetermined time intervals for a period during which an imaging mode is selected, and is displayed on the liquid crystal monitor 40. The display controller 39 displays an image based on image data which is stored in an external recording media 38 and is included in an image file read out by a media controller 37 on the liquid crystal monitor 40.

A live preview image for checking a subject at the time of imaging is displayed on the liquid crystal monitor 40. The liquid crystal monitor performs the playback and display of a captured still image or video and the display of various setting menus in addition to a function of an electronic viewfinder.

The AF processing unit 32 determines a focusing set value (focus driving amount) based on the detected focusing position, and outputs the focus driving amount data. The focus lens drive unit 20a step-drives the focus lens 10a based on the output focus driving amount data (AF processing). In the present embodiment, a contrast detection method is employed as a method of detecting the focusing position.

The AF processing unit 32 performs AF search for obtaining a plurality of image data items by causing the CCD 13 to stepwisely image the subject for each predetermined position of the focus lens 10a with a preset search width and a preset number of times of searches at the exposure time set by an exposure time setting unit 46 to be described below while moving the focus lens 10a in the optical axis direction within a search range for preset focusing by the focus lens drive unit 20a. The search range, the search width, and the number of times of searches may be values set for the digital camera 1 in advance or may be set through the operation unit 26 by a user.

In a case where an imaging instruction is received from a photographer, a focusing position detected by a focusing position calculating unit 44 to be described below is used as a focusing position at the time of actual imaging performed by fully pressing the release button 27. A focusing set value (focus driving amount) is determined based on the focusing position, and the focus driving amount data is output.

The AE processing unit 33 measures subject luminance (a value in a metering mode) based on the image data, determines an exposure set value such as an F number and an exposure time (shutter speed) based on the measured subject luminance, and outputs the F number data and the exposure time data. Based on the output F number data and exposure time data, the stop drive unit 21 adjusts the stop diameter of the stop 11, and the shutter drive unit 22 controls the opening and closing of the shutter 12 (AE processing). The AE processing unit 33 outputs the exposure time at the time of actual imaging and the exposure time data at the time of AF search for obtaining the image data to be used in the calculation of the focusing position.

An AWB processing unit 34 calculates color temperature based on the image data, and automatically adjusts white balance at the time of imaging according to the calculated color temperature (AWB processing). The AWB processing unit 34 may adjust white balance before imaging and after the imaging.

The image signal processing unit 41 performs gamma-correction processing, contour emphasis (sharpness) processing, contrast processing, and quality correction processing such as noise reduction processing on image data of an actual image, and performs YC processing for converting the CCD-RAW data into YC data which includes Y data which is a brightness signal, Cb data which is a blue color difference signal, and Cr data which is a red color difference signal.

For example, the actual image is a still image or a video of the image data which is received the CCD 13 at the time of actual imaging performed by fully pressing the release button 27 and is stored in the frame memory 36 through the analog signal processing unit 14 and the image input controller 31 in a case where the imaging instruction is received from the photographer. The upper limit of the number of pixels of the actual image is determined by the number of pixels of the CCD 13. However, the number of recording pixels may be changed depending on quality setting (setting of full-pixel, half-pixel, or automatic pixel) capable of being set by the photographer. Meanwhile, the number of pixels of the live preview image may be smaller than that of the actual image, and may be, for example, about $\frac{1}{16}$ of the number of pixels of the actual image.

The compression/decompression processing unit 35 generates an image file by performing compression processing on the image data of the actual image on which the quality correction is performed by the image signal processing unit 41 in a compression format such as the Joint Photographic Experts Group (JPEG) in the case of the still image or the Moving Photographic Experts Group (MPEG) in the case of the video. A tag that stores accessory information such as imaging date and time or an imaging scene is added to the image file based on Exchangeable image file format (Exif).

The compression/decompression processing unit 35 reads out the compressed image file from the external recording media 38, and performs decompression processing in a playback mode. The decompressed image data is output to the display controller 39, and the display controller 39 displays the image based on the image data on the liquid crystal monitor 40.

The media controller 37 corresponds to a media slot which is an insertion opening into which the external recording media 38 such as a memory card is inserted and reads out or writes the data in a case where the external recording media 38 is inserted. The media controller reads the image file stored in the external recording media 38, or writes the image file.

An internal memory 42 stores various constants set in the digital camera 1 and a program executed by the CPU 30.

Hereinafter, a focusing position detecting device 100 provided on the digital camera 1 will be described. The focusing position detecting device 100 according to the present embodiment includes a contrast evaluation value calculating unit 43, a focusing position calculating unit 44, a detection unit 45, and an exposure time setting unit 46.

The contrast evaluation value calculating unit 43 calculates contrast evaluation values from the plurality of image data items which is obtained through AF search using the AF processing unit 32 and is stored in the frame memory 36 through the analog signal processing unit 14 and the image input controller 31. The calculation of the contrast evaluation values using the contrast evaluation value calculating unit 43 may be performed by the known technology performed by using a high-pass filter or a band-pass filter. Frequency characteristics of each filter are adjusted, and thus, it is possible to adjust the magnitude of the contrast evaluation value or a shape of a peak in an evaluation value curve represented as a graph in which a lateral axis depicts a focusing position of the imaging lens and a vertical axis depicts the contrast evaluation value. In the present embodiment, high frequency components are obtained by filtering the image data, and a value obtained by integrating an absolute value of the high frequency components is used as the contrast evaluation value.

The focusing position calculating unit 44 calculates the focusing position from the focus positions at the time of imaging the image data items as calculation sources of the contrast evaluation values and the contrast evaluation values calculated by the contrast evaluation value calculating unit 43. In the present embodiment, the focusing position is calculated with a position in which the calculated contrast evaluation value is highest, that is, a peak value as a reference. Specifically, as the focusing position, a focusing position corresponding to a peak value of the contrast evaluation value is calculated through interpolation calculation based on a focusing position in which the contrast evaluation value is maximized, a plurality of focusing positions present before and after this focusing position, and the contrast evaluation values corresponding to these focusing positions.

A detection unit 45 detects atmospheric fluctuation. Information indicating that there is the atmospheric fluctuation is input by the user through the operation unit 26, and thus, the atmospheric fluctuation is detected. Although it has been described in the present embodiment that the atmospheric fluctuation is manually detected by the user, the present invention is not limited thereto. For example, in a case where the digital camera 1 performs imaging in a still image imaging mode, a change of a reference point determined among the image data items with the elapse of time is found through image analysis by using a plurality of captured image data items, and it may be detected that there is the atmospheric fluctuation in a case where it is determined that there is the change as the result of the image analysis. The detection of the atmospheric fluctuation may be performed by the known technology.

In a case where the atmospheric fluctuation is detected by the detection unit 45, the exposure time setting unit 46 sets an exposure time at the time of AF search for obtaining the image data to be used in the calculation of the focusing position so as to be longer than the exposure time set by the AE processing unit 33, and outputs the set exposure time to the AE processing unit 33. The AE processing unit 33 outputs the exposure time data at the time of AF search output from the exposure time setting unit 46.

The disorder of the shape of the evaluation value curve caused by the atmospheric fluctuation is strongly related to the exposure time at the time of imaging the image data items as the calculation sources of the contrast evaluation values. As the exposure time becomes shorter, the subject image is vivid. However, since a shape difference of the subject image between the captured image data items becomes larger, there are many cases where the shape of the evaluation value curve is in disorder. Meanwhile, as the exposure time becomes longer, the subject image is not vivid. However, since the image data items are time-averaged and the subject image becomes an image having no fluctuation, the shape difference of the subject image between the image data items is decreased. Thus, there are few cases where the shape of the evaluation value curve is in disorder. Accordingly, in a case where the atmospheric fluctuation is caused by setting the exposure time at the time of AF search in a case where the atmospheric fluctuation is detected so as to be longer than the set exposure time, that is, the exposure time at the time of AF search in a case where the atmospheric fluctuation is not detected, the subject image is not vivid in the plurality of obtained image data items. However, since the image data items are time-averaged and the subject image becomes the image having no fluctuation, it is possible to decrease the shape difference of the subject image between the image data items. Accordingly, it is possible to reduce the variation of the contrast evaluation values caused by the fluctuation of the subject image, and thus, it is possible to more accurately calculate the focusing position.

The CPU 30 controls the units of the main body of the digital camera 1 in response to the operation using the operation unit 26 or the signals from the functional blocks.

The data bus 60 is connected to the image input controller 31, the various processing units 14, 32 to 35, and 41, the frame memory 36, the various controllers 37 and 39, the internal memory 42, the contrast evaluation value calculating unit 43, the focusing position calculating unit 44, the detection unit 45, the exposure time setting unit 46, and the CPU 30, and various signals and data items are transmitted and received through the data bus 60.

In the digital camera 1 having the above-described configuration, the imaging mode or the playback mode is set by the user through the operation unit 26. In the imaging mode, the user checks the composition of the subject through the live preview image displayed on the liquid crystal monitor 40, performs the AE processing by halfway pushing the release button 27, and determines the F number to be used in the actual imaging, the exposure time (shutter speed), and the exposure set value such as the exposure time to be used in the imaging at the time of AF search. Subsequently, the user performs the AF processing, determines the focusing position for the actual imaging, and performs the actual imaging based on the data items output through the AE processing and the AF processing by fully pushing the release button 27. Thereafter, the user records the image data items obtained through the actual imaging in the external recording media 38.

Figure 2:
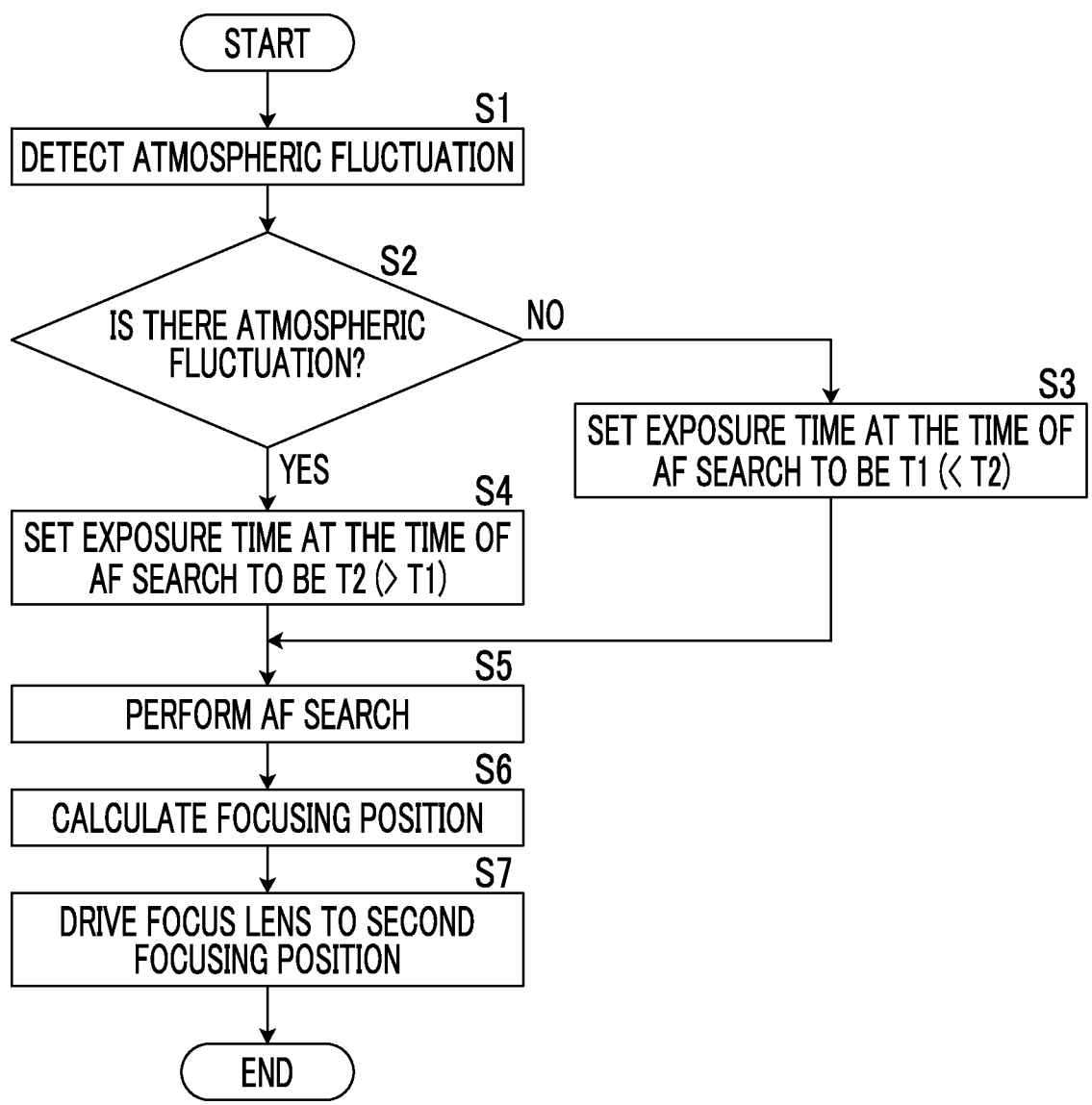
FIG. 2 is a flowchart for describing a flow of AF processing of the digital camera of FIG. 1.

Hereinafter, the AF processing including the focusing position detecting process in the digital camera 1 having the above-described configuration will be described in detail with reference to the drawings. FIG. 2 is a diagram showing a flowchart for describing a flow of the AF processing of the digital camera 1.

Initially, the detection unit 45 detects whether or not there is the atmospheric fluctuation (step S1) as shown in FIG. 2. In a case where there is no atmospheric fluctuation (step S2; NO), the exposure time setting unit 46 sets the exposure time to be used in the imaging at the time of AF search to be T1 (<T2) (step S3), and the focusing position calculating unit 44 causes the AF processing unit 32 to perform the AF search (step S5). Here, the exposure time T1 is an exposure time in a case where there is no atmospheric fluctuation, that is, in a normal state, and the exposure time T2 is an exposure time in a case where there is the atmospheric fluctuation. The exposure time setting unit 46 sets the exposure time T2 so as to be longer than the exposure time T1.

Meanwhile, in a case where there is the atmospheric fluctuation in step S2 (step S2; YES), the exposure time setting unit 46 sets the exposure time to be used at the time of AF search to be T2 (>T1) (step S4), and the focusing position calculating unit 44 causes the AF processing unit 32 to perform the AF search (step S5).

Subsequently, the contrast evaluation value calculating unit 43 calculates the contrast evaluation values from the plurality of image data items obtained through the AF search using the AF processing unit 32 by the above-described method, and the focusing position calculating unit 44 calculates the focusing position from the focus positions at the time of AF search and the contrast evaluation values calculated by the contrast evaluation value calculating unit 43 and outputs the calculated focusing position to the AF processing unit 32 (step S6). The focusing position detecting device 100 according to the present embodiment performs the processes of steps S1 to S6 in FIG. 2.

Subsequently, the AF processing unit 32 determines the focusing set value (focus driving amount) based on the focusing position output from the focusing position calculating unit 44 and outputs the focus driving amount data, and the focus lens drive unit 20a step-drives the focus lens 10a to the focusing position based on the focus driving amount data output from the AF processing unit 32 (step S7).

As stated above, the digital camera 1 performs the AF processing. In accordance with the focusing position detecting method using the focusing position detecting device 100 of the digital camera 1 according to the present embodiment, since the exposure time at the time of AF search in a case where the atmospheric fluctuation is detected is set so as to be longer than the set exposure time, that is, the exposure time at the time of AF search in a case where the atmospheric fluctuation is not detected, the subject image is not vivid in the plurality of obtained image data items in a case where the atmospheric fluctuation occurs. However, since the image data items are time-averaged and the subject image becomes an image having no fluctuation, it is possible to reduce a shape difference of the subject image between the image data items, it is possible to reduce a variation of the contrast evaluation value caused by the fluctuation of the subject image, and it is possible to more accurately calculate the focusing position.

Although it has been in the digital camera 1 according to the present embodiment that the contrast evaluation value calculating unit 43 and the focusing position calculating unit 44 of the focusing position detecting device 100 are provided in addition to the AF processing unit 32, the present invention is not limited thereto. For example, the AF processing unit 32 may function as the contrast evaluation value calculating unit 43 and the focusing position calculating unit 44 of the focusing position detecting device 100.

Although it has been described in the digital camera 1 according to the present embodiment that the exposure time setting unit 46 of the focusing position detecting device 100 is provided in addition to the AE processing unit 33, the present invention is not limited thereto. For example, the AE processing unit 33 may function as the exposure time setting unit 46 of the focusing position detecting device 100.

Figure 3:
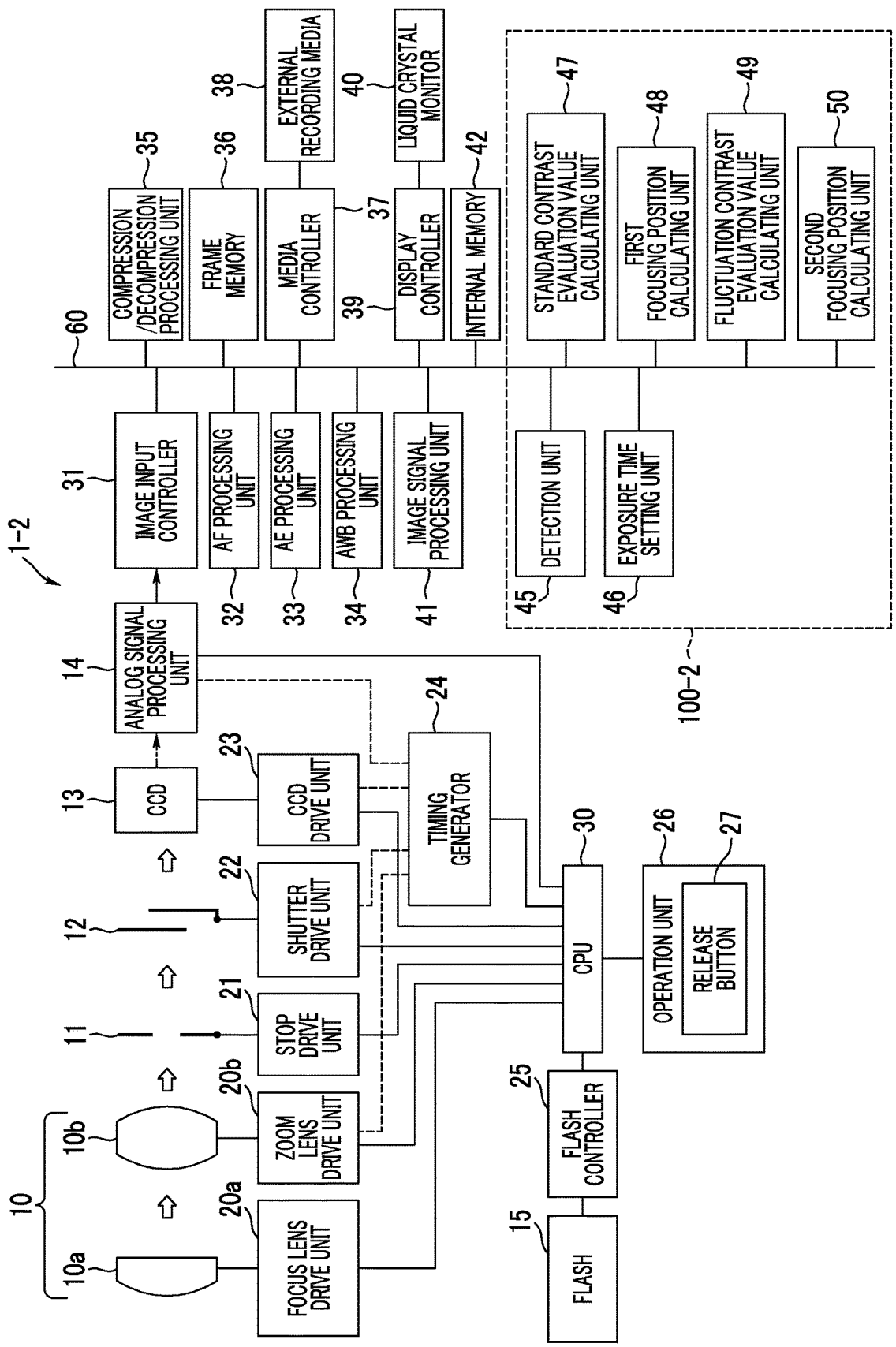
FIG. 3 is a block diagram of a digital camera including a focusing position detecting device according to a second embodiment of the present invention.

Hereinafter, an example in which a digital camera 1-2 including a focusing position detecting device 100-2 according to a second embodiment of the present invention is used as a second embodiment of the present invention will be described. FIG. 3 shows a block diagram showing a functional configuration of the digital camera 1-2. In the digital camera 1-2 according to the second embodiment, the same components in the block diagram of FIG. 3 as those in the block diagram of FIG. 1 described in the first embodiment will be assigned the same references, and the description thereof will be omitted. Only components different from those in the first embodiment will be described.

The digital camera 1-2 shown in FIG. 3 is provided with the focusing position detecting device 100-2. The focusing position detecting device 100-2 includes a standard contrast evaluation value calculating unit 47, a first focusing position calculating unit 48, a fluctuation contrast evaluation value calculating unit 49, and a second focusing position calculating unit 50, in addition to the detection unit 45 and the exposure time setting unit 46.

The standard contrast evaluation value calculating unit 47 calculates the contrast evaluation values from the plurality of image data items which is obtained through AF search using the AF processing unit 32 that obtains the plurality of image data items by causing the CCD 13 to stepwisely image the subject for each predetermined position of the focus lens 10*a* with a preset search width and a preset number of times of searches at the exposure time T1 set by the exposure time setting unit 46 and is stored in the frame memory 36 through the analog signal processing unit 14 and the image input controller 31 while moving the focus lens 10*a* in the optical axis direction within a first search range for preset focusing. The calculation of the contrast evaluation values using the standard contrast evaluation value calculating unit 47 may be performed by the known technology performed by using a high-pass filter or a band-pass filter. Frequency characteristics of each filter are adjusted, and thus, it is possible to adjust the magnitude of the contrast evaluation value or a shape of a peak in an evaluation value curve represented as a graph in which a lateral axis depicts a focusing position of the imaging lens and a vertical axis depicts the contrast evaluation value. In the present embodiment, high frequency components are obtained by filtering the image data, and a value obtained by integrating an absolute value of the high frequency components is used as the contrast evaluation value.

The first focusing position calculating unit 48 calculates a first focusing position from the focus positions at the time of imaging the image data items as calculation sources of the contrast evaluation values and the contrast evaluation values calculated by the standard contrast evaluation value calculating unit 47. In the present embodiment, the first focusing position is calculated with a position in which the calculated contrast evaluation value is highest, that is, a peak value as a reference. Specifically, as the first focusing position, a focusing position corresponding to a peak value of the contrast evaluation value is calculated through interpolation calculation based on a focusing position in which the contrast evaluation value is maximized, a plurality of focusing positions present before and after this focusing position, and contrast evaluation values corresponding to these focusing positions.

In a case where the detection unit 45 detects the atmospheric fluctuation, the fluctuation contrast evaluation value calculating unit 49 calculates the contrast evaluation values from the plurality of image data items which is obtained through the AF search using the AF processing unit 32 that obtains the plurality of image data items by causing the CCD 13 to stepwisely image the subject for each predetermined position of the focus lens 10*a* with a preset search width and a preset number of times of searches at the exposure time T2 in a case where the atmospheric fluctuation is detected, which is set by the exposure time setting unit 46 and is stored in the frame memory 36 through the analog signal processing unit 14 and the image input controller 31 while moving the focus lens 10*a* within a second search range which includes the first focusing position calculated by the first focusing position calculating unit 44 and is narrower than the first search range in the optical axis direction.

The second focusing position calculating unit 50 calculates a second focusing position from the focus positions at the time of imaging the image data items as the calculation sources of the contrast evaluation values calculated by the fluctuation contrast evaluation value calculating unit 49 and the contrast evaluation values calculated by the fluctuation contrast evaluation value calculating unit 49. In the present embodiment, the second focusing position is calculated with a position in which the calculated contrast evaluation value is highest, that is, a peak value as a reference. Specifically, similarly to the first focusing position, as the second focusing position, a focusing position corresponding to a peak value of the contrast evaluation value is calculated through interpolation calculation based on a focusing position in which the contrast evaluation value is maximized, a plurality of focusing positions present before and after this focusing position, and contrast evaluation values corresponding to these focusing positions.

Figure 4:
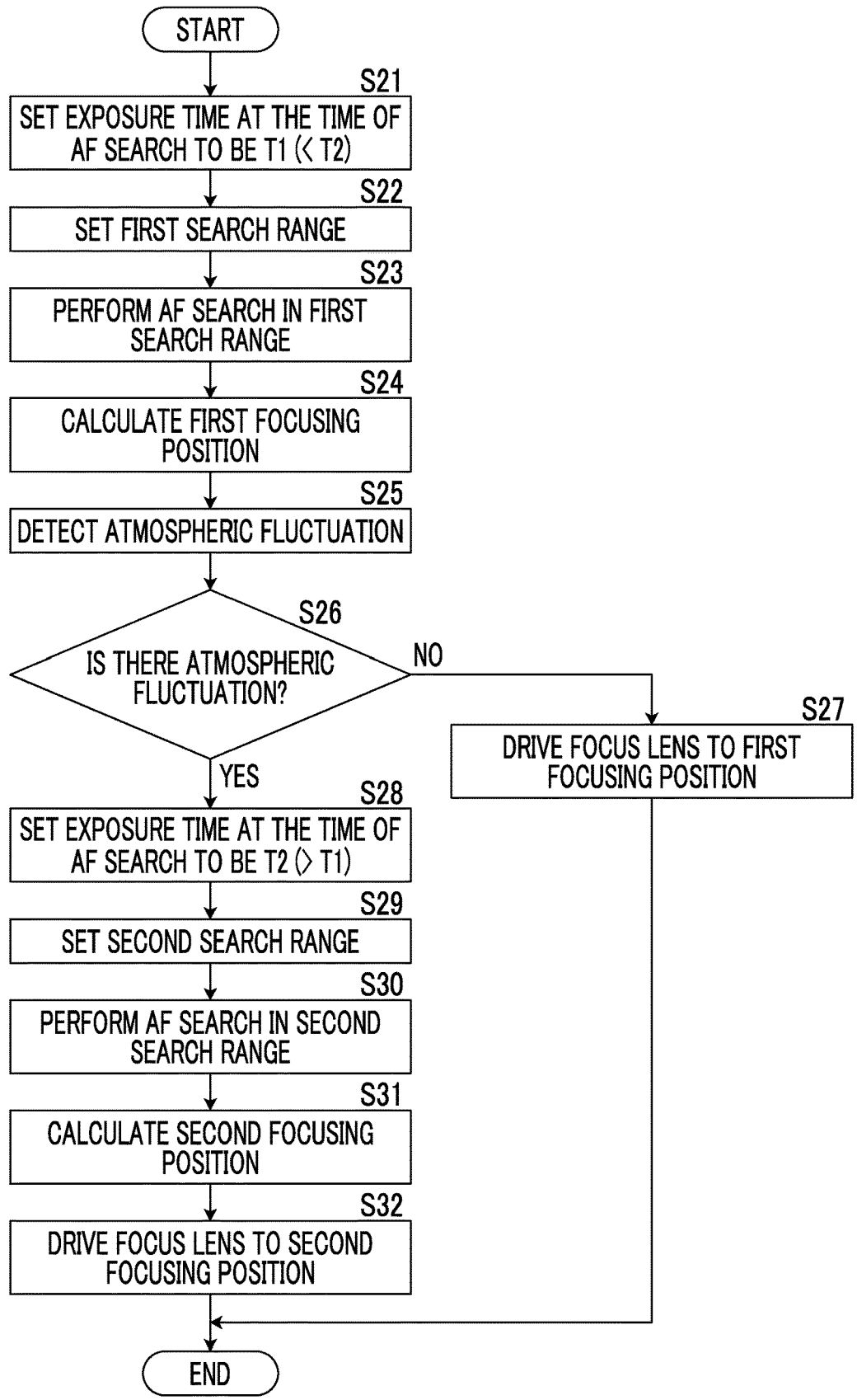
FIG. 4 is a flowchart for describing a flow of AF processing of the digital camera of FIG. 3.
Figure 5:
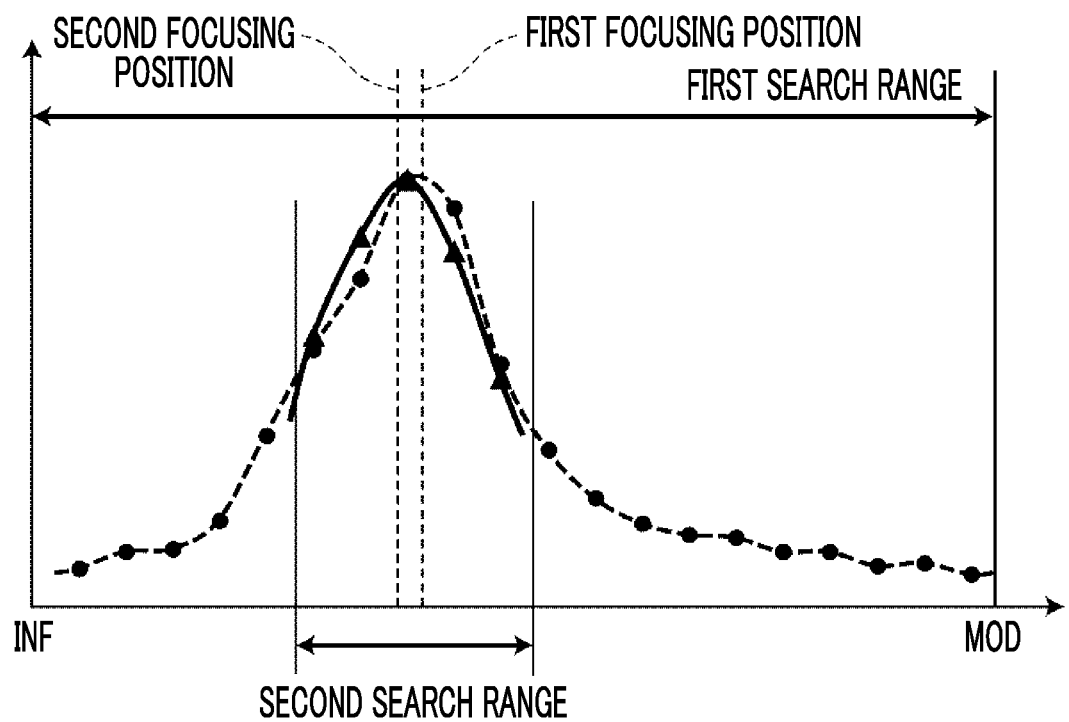
FIG. 5 is a diagram showing an example of evaluation value curves and AF search ranges.

Hereinafter, the AF processing including the focusing position detecting process in the digital camera 1-2 having the above-described configuration will be described in detail with reference to the drawings. FIG. 4 is a diagram showing a flowchart for describing a flow of the AF processing of the digital camera 1-2, and FIG. 5 is a diagram showing an example of evaluation value curves and AF search ranges.

Initially, as shown in FIG. 4, the exposure time setting unit 46 sets the exposure time to be used in the imaging at the time of AF search to be T1 (<T2) (step S21), and a first search range is set by the user through the operation unit 26 (step S22). Here, the exposure time T1 is an exposure time in a case where there is no atmospheric fluctuation, that is, in a normal state, and the exposure time T2 is an exposure time in a case where there is the atmospheric fluctuation. The exposure time setting unit 46 sets the exposure time T2 so as to be longer than the exposure time T1. A value set for the digital camera 1-2 in advance may be used as the first search range. In the present embodiment, a range between INF, that is, a distance of infinity and MOD, that is, the shortest imaging distance is used as the first search range, as shown in FIG. 5.

Subsequently, the first focusing position calculating unit 48 causes the AF processing unit 32 to perform the AF search in the first search range (step S23). In the present embodiment, imaging is performed by 20 times in the first search range, as shown in FIG. 5. The standard contrast evaluation value calculating unit 47 calculates the contrast evaluation values from 20 image data items obtained through the AF search using the AF processing unit 32 by the above-described method, and the first focusing position calculating unit 48 calculates the first focusing position from each focus position at the time of AF search and the contrast evaluation value calculated by the standard contrast evaluation value calculating unit 47 (step S24).

Subsequently, the detection unit 45 detects whether or not there is the atmospheric fluctuation (step S25), and the first focusing position calculated by the first focusing position calculating unit 48 is output to the AF processing unit 32 in a case where there is no atmospheric fluctuation (step S26; NO). The AF processing unit 32 determines the focusing set value (focus driving amount) based on the first focusing position output from the first focusing position calculating unit 48 and outputs the focus driving amount data. The focus lens drive unit 20a step-drives the focus lens 10a to the first focusing position based on the focus driving amount data output from the AF processing unit 32 (step S27).

Meanwhile, in a case where there is the atmospheric fluctuation (step S26; YES), the exposure time setting unit 46 sets the exposure time to be used in the imaging at the time of AF search to be T2 (>T1) (step S28), and a second search range is set by the user through the operation unit 26 (step S29). Here, the exposure time T2 is set to be longer than the exposure time T1 by the exposure time setting unit 46. The second search range may be selected among a plurality of values set to the digital camera 1-2 in advance by the user through the operation unit 26. It is assumed that the second search range is set in a range which includes the first focusing position and includes evaluation values before and after the first focusing position by considering that a plurality of evaluation values is required in order to calculate the second focusing position, and it is assumed that a center of the second search range is the first focusing position as shown in FIG. 5 in the present embodiment. Specifically, the second search range is set so as to obtain the first focusing position as a reference and two points before and after the first focusing position, that is, five evaluation values.

Subsequently, the second focusing position calculating unit 50 causes the AF processing unit 32 to perform the AF search in the second search range (step S30). In the present embodiment, imaging is performed by five times within the second search range, as shown in FIG. 5. The fluctuation contrast evaluation value calculating unit 49 calculates the contrast evaluation values from five image data items obtained through the AF search using the AF processing unit 32 by the above-described method. The second focusing position calculating unit 50 calculates the second focusing position from each focus position at the time of AF search and the contrast evaluation value calculated by the fluctuation contrast evaluation value calculating unit 49 (step S31), and outputs the second focusing position calculated by the second focusing position calculating unit 50 to the AF processing unit 32. The AF processing unit 32 determines the focusing set value (focus driving amount) based on the second focusing position output from the second focusing position calculating unit 50 and outputs the focus driving amount data. The focus lens drive unit 20a step-drives the focus lens 10a to the second focusing position based on the focus driving amount data output from the AF processing unit 32 (step S32). As stated above, the digital camera 1-2 performs the AF processing.

Figure 6:
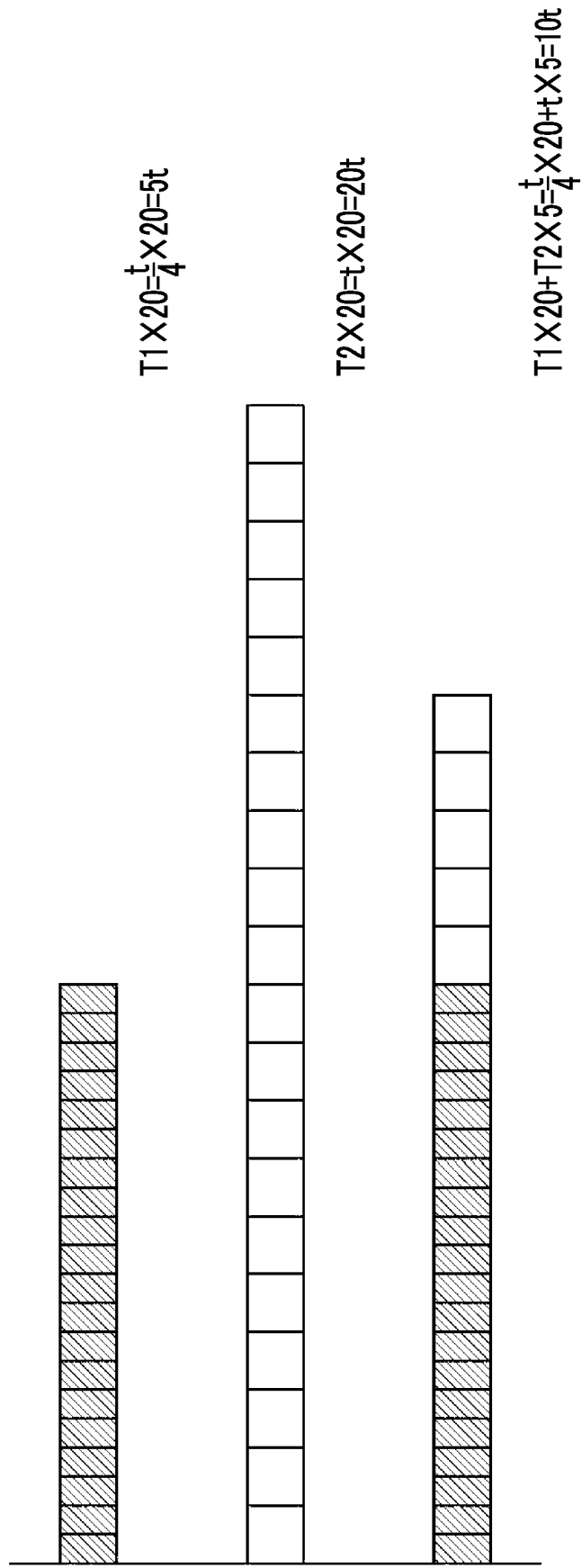
FIG. 6 is a diagram for describing the setting of an exposure time.

In accordance with the focusing position detecting method using the focusing position detecting device 100-2 of the digital camera 1-2 according to the present embodiment, in a case where the atmospheric fluctuation is detected, the exposure time T2 is set to be longer than the exposure time in a case where the atmospheric fluctuation is not detected, and the AF search is performed. FIG. 6 is a diagram for describing the setting of the exposure time.

In a case where the exposure time T1 is t/4 ms in a case where the atmospheric fluctuation is not detected and the exposure time T2 in a case where the atmospheric fluctuation is detected is four times the exposure time T1 in a case where the atmospheric fluctuation is not detected, that is, the exposure time T2 is t ms, since a time required to perform imaging once becomes longer in a case where the exposure time becomes longer, a time required for the entire AF search also becomes longer. For example, in a case where the number of times of searches N1 in the first search range is 20, the exposure time T1 is 5 ms in a case where the atmospheric fluctuation is not detected, and the exposure time T2 in a case where the atmospheric fluctuation is detected is 20 ms, a time required for search satisfies T1×20=5×20=100 ms in the case of the exposure time T1, and a time required for search satisfies T2×20=20×20=400 ms in the case of the exposure time T2.

In the digital camera 1-2 according to the present embodiment, after the first focusing position is calculated by performing the AF search in the first search range at the exposure time T1 in a case where the atmospheric fluctuation is not detected, the detection unit 45 detects the atmospheric fluctuation. Only in a case where the atmospheric fluctuation is detected, the second focusing position is calculated by setting the exposure time to be the exposure time T2 in a case where there is the atmospheric fluctuation and performing the AF search in the second search range which includes the first focusing position and is narrower than the first search range. In the present embodiment, the AF search in the first search range and the AF search in the second search range have the same interval in the number of times of adjacent searches, that is, the same search width.

That is, in a case where the number of times of searches N2 within the second search range is five as shown in FIG. 6 and the atmospheric fluctuation is detected, a time required for the AF search in the second search range satisfies T2×5=20×5=100 ms, and the sum of the time T2 and a time 100 ms required for the AF search in the first search range is 200 ms. 200 ms is shorter than 400 ms which is a time required for the AF search at the time of AF search in the first search range at the exposure time T2 in a case where the atmospheric fluctuation is detected.

Therefore, in accordance with the focusing position detecting method using the focusing position detecting device 100-2 of the digital camera 1-2 according to the present embodiment, the AF search is performed again only in a case where the atmospheric fluctuation is detected, and unnecessary AF search is not performed. Thus, it is possible to reduce a time required for AF search. That is, it is possible to suppress an increase in time of the AF search caused by setting the exposure time at the time of AF search in a case where the atmospheric fluctuation is detected to be longer than the set exposure time, that is, the exposure time at the time of AF search in a case where the atmospheric fluctuation is not detected.

Figure 7:
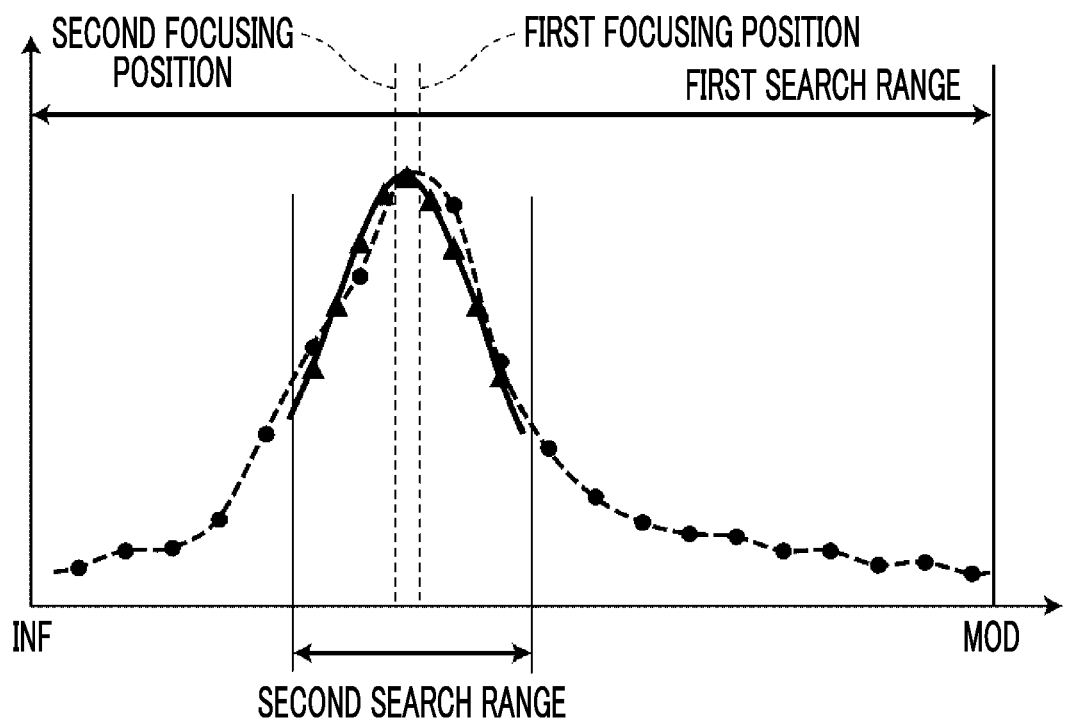
FIG. 7 is a diagram showing another example of the evaluation value curves and the AF search ranges.

Although it has been described in the present embodiment that the AF search within the first search range and the AF search within the second range have the same interval of the number of times of adjacent searches, that is, the same search width, the present invention is not limited thereto. The AF searches within the first and second search ranges may have different search widths. FIG. 7 is a diagram showing an example of evaluation value curves and AF search ranges in a case where the search widths are different. The first search range, the number of times of searches within the first search range, the search width, and the second search range are equal to the values shown in FIG. 6 described in the aforementioned embodiment.

As shown in FIG. 7, in a case where the search width in the second search range is set to be shorter than a search width in the first search range and the number of times of searches in the second search range is 9 which is larger than that in the aforementioned embodiment, a time required for AF search within the second search range satisfies T2×9=20×9=180 ms in a case where the atmospheric fluctuation is detected. The sum of the time T2 and a time 100 ms required for AF search within the first search range is 280 ms. 280 ms is shorter than 400 ms which is a time required for search at the time of AF search at the exposure time T2 in the first search range in a case where the atmospheric fluctuation is detected.

Therefore, it is possible to suppress an increase in time of the AF search caused by setting the exposure time at the time of AF search in a case where the atmospheric fluctuation is detected to be longer than the set exposure time, that is, the exposure time at the time of AF search in a case where the atmospheric fluctuation is not detected. Further, since it is possible to increase the number of times of searches by shortening the search width, it is possible to calculate many contrast evaluation values in the second search range in a case where the atmospheric fluctuation is detected, and it is possible to more accurately detect the focusing position corresponding to the peak value of the contrast evaluation value.

Figure 8:
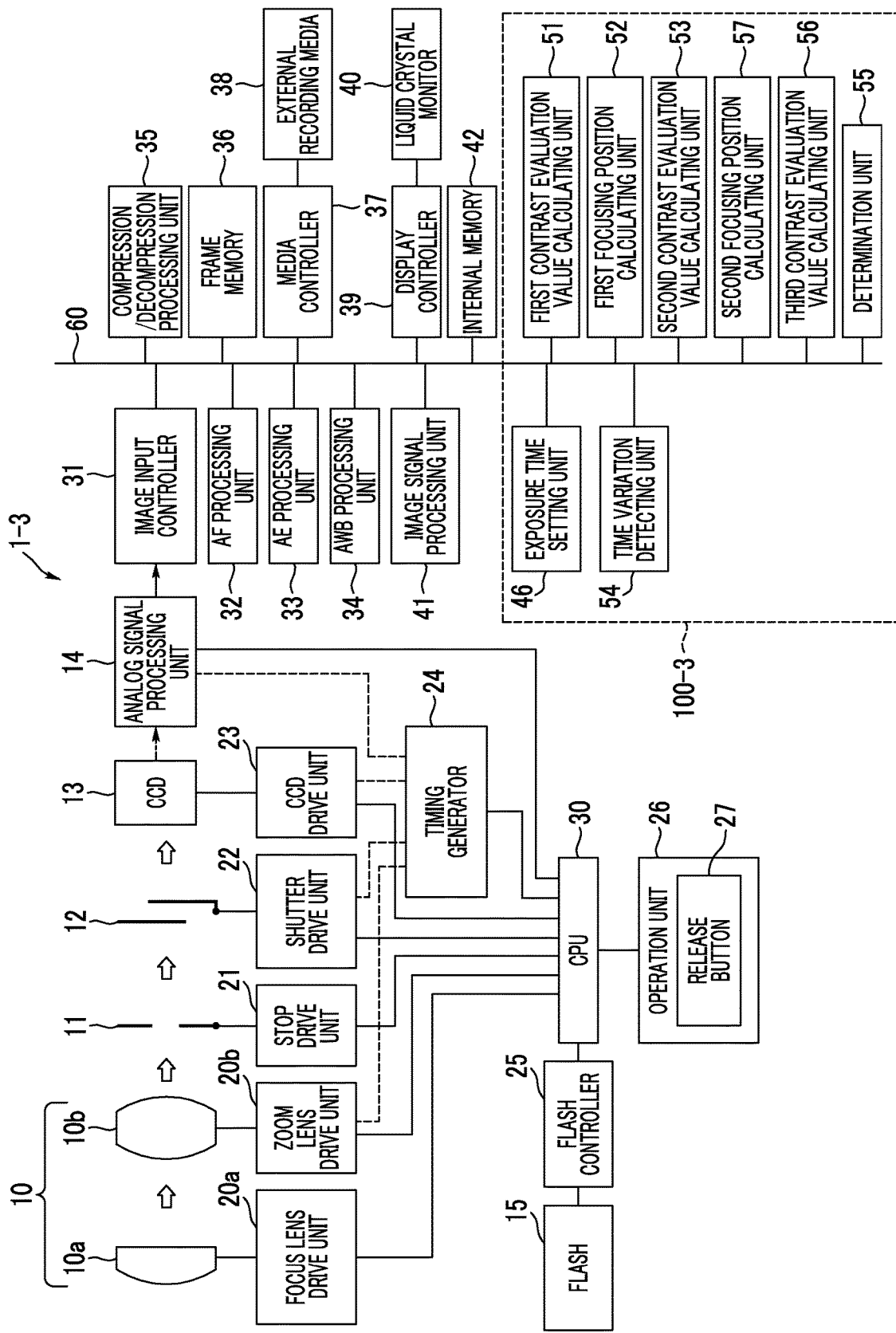
FIG. 8 is a block diagram of a digital camera including a focusing position detecting device according to a third embodiment of the present invention.

Hereinafter, an example in which a digital camera 1-3 including a focusing position detecting device 100-3 according to a third embodiment of the present invention is used as a third embodiment of the present invention will be described. FIG. 8 shows a block diagram showing a functional configuration of the digital camera 1-3. In the digital camera 1-3 according to the third embodiment, the same components in the block diagram of FIG. 8 as those in the block diagram of FIG. 1 described in the first embodiment will be assigned the same references, and the description thereof will be omitted. Only components different from those in the first embodiment will be described.

The digital camera 1-3 shown in FIG. 8 is provided with the focusing position detecting device 100-3. The focusing position detecting device 100-3 does not include the detection unit 45, and includes a first contrast evaluation value calculating unit 51, a first focusing position calculating unit 52, a second contrast evaluation value calculating unit 53, a time variation detecting unit 54, a determination unit 55, a third contrast evaluation value calculating unit 56, and a second focusing position calculating unit 57, in addition to the exposure time setting unit 46.

The first contrast evaluation value calculating unit 51 calculates the contrast evaluation values from the plurality of image data items which is obtained through the first AF search using the AF processing unit 32 that obtains the plurality of image data items by causing the CCD 13 to stepwisely image the subject for each predetermined position of the focus lens 10a with a preset search width and a preset number of times of searches at the exposure time T1 set by the exposure time setting unit 46 and is stored in the frame memory 36 through the analog signal processing unit 14 and the image input controller 31 while moving the focus lens 10a in the optical axis direction within the first search range for preset focusing. The calculation of the contrast evaluation value using the first contrast evaluation value calculating unit 51 may be performed by the known technology performed by using a high-pass filter or a band-pass filter. Frequency characteristics of each filter are adjusted, and thus, it is possible to adjust the magnitude of the contrast evaluation value or a shape of a peak in an evaluation value curve represented as a graph in which a lateral axis depicts a focusing position of the imaging lens and a vertical axis depicts the contrast evaluation value. In the present embodiment, high frequency components are obtained by filtering the image data, and a value obtained by integrating an absolute value of the high frequency components is used as the contrast evaluation value.

The first focusing position calculating unit 52 calculates the first focusing position from the focus positions at the time of imaging the image data items as the calculation sources of the contrast evaluation values and the contrast evaluation values calculated by the first contrast evaluation value calculating unit 51. In the present embodiment, the first focusing position is calculated with a position in which the calculated contrast evaluation value is highest, that is, a peak value as a reference. Specifically, as the first focusing position, a focusing position corresponding to a peak value of the contrast evaluation value is calculated through interpolation calculation based on a focusing position in which the contrast evaluation value is maximized, a plurality of focusing positions present before and after this focusing position, and contrast evaluation values corresponding to these focusing positions.

The second contrast evaluation value calculating unit 53 calculates the contrast evaluation values from the plurality of image data items which is obtained by causing the CCD 13 to image the subject a multiple number of times without changing the focus position and is stored in the frame memory 36 through the analog signal processing unit 14 and the image input controller 31 at the exposure time T1 set by the exposure time setting unit 46 in the first focusing position calculated by the first focusing position calculating unit 44. Since the contrast evaluation values obtained by the second contrast evaluation value calculating unit 53 are used to determine whether or not the contrast evaluation values are changed by a time variation detecting unit 54 to be described below, the CCD 13 images the subject at least two times without changing the focus position.

The time variation detecting unit 54 detects a time variation of two or more contrast evaluation values calculated by the second contrast evaluation value calculating unit 53. For example, in a case where the CCD 13 images the subject five times without changing the focus position and the second contrast evaluation value calculating unit 53 calculates five contrast evaluation values, the detection of the time variation is performed by detecting a difference between the maximum value and the minimum value of the five contrast evaluation values. Although it has been described in the present embodiment that the difference between the maximum value and the minimum value of the five contrast evaluation values is detected, the present invention is not limited thereto. For example, a standard deviation may be detected.

The determination unit 55 determines whether or not the contrast evaluation values are influenced by the atmospheric fluctuation from the detection result of the time variation by the time variation detecting unit 54. Specifically, in a case where a value of the difference between the maximum value and the minimum value of the five contrast evaluation values calculated by the time variation detecting unit 54 is larger than a preset threshold value, it is determined that the contrast evaluation values are in disorder and are influenced by the atmospheric fluctuation. The threshold value may be a threshold value set to the digital camera 1-3 in advance, or may be set by the user through the operation unit 26. The threshold value may be automatically calculated. Hereinafter, an example of a method of automatically calculating and determining the threshold value will be described.

In a case where the maximum contrast evaluation value Vmax and a smaller value of contrast evaluation values of focusing positions before and after the focusing position corresponding to the maximum contrast evaluation value Vmax is the minimum contrast evaluation value Vmin, among the contrast evaluation values calculated by the first contrast evaluation value calculating unit 51 in the first AF search, a determination threshold value Thres is calculated by the following expression (1).

$$\text{Thres} = (V\text{max} - V\text{min}) \times K \quad (1)$$

Here, K is a preset threshold value adjustment parameter, and is empirically set as a value in range of 0.05 to 0.2.

Vmax−Vmin represents a peak shape of an evaluation value curve. As the value becomes larger, the peak becomes sharper. As the value becomes smaller, the peak is flat. Meanwhile, the calculation accuracy of the focusing position is deteriorated as an error of Vmax or Vmin becomes larger. As an error of the contrast evaluation value caused by the atmospheric fluctuation becomes smaller than that of Vmax−Vmin, the influence on the focusing position accuracy becomes smaller. Thus, the determination threshold value is in proportion to Vmax−Vmin.

In a case where the determination unit 55 determines that the contrast evaluation values are influenced by the atmospheric fluctuation, the third contrast evaluation value calculating unit 56 calculates the contrast evaluation values from the plurality of image data items which is obtained through the AF search using the AF processing unit 32 that obtains the plurality of image data items by causing the CCD 13 to stepwisely image the subject for each predetermined position of the focus lens 10a with a preset search width and a preset number of times of searches at the exposure time T2 in a case where the atmospheric fluctuation is detected, which is set by the exposure time setting unit 46, and is stored in the frame memory 36 through the analog signal processing unit 14 and the image input controller 31 while moving the focus lens 10a within the second search range which includes the first focusing position calculated by the first focusing position calculating unit 52 and is narrower than the first search range in the optical axis direction.

The second focusing position calculating unit 57 calculates the second focusing position from the focus positions at the time of imaging the image data items as the calculation sources of the contrast evaluation values calculated by the third contrast evaluation value calculating unit 56 and the contrast evaluation values calculated by the third contrast evaluation value calculating unit 56. In the present embodiment, the second focusing position is calculated with a position in which the calculated contrast evaluation value is highest, that is, a peak value as a reference. Specifically, similarly to the first focusing position, as the second focusing position, a focusing position corresponding to a peak value of the contrast evaluation value is calculated through interpolation calculation based on a focusing position in which the contrast evaluation value is maximized, a plurality of focusing positions present before and after this focusing position, and contrast evaluation values corresponding to these focusing positions.

Figure 9:
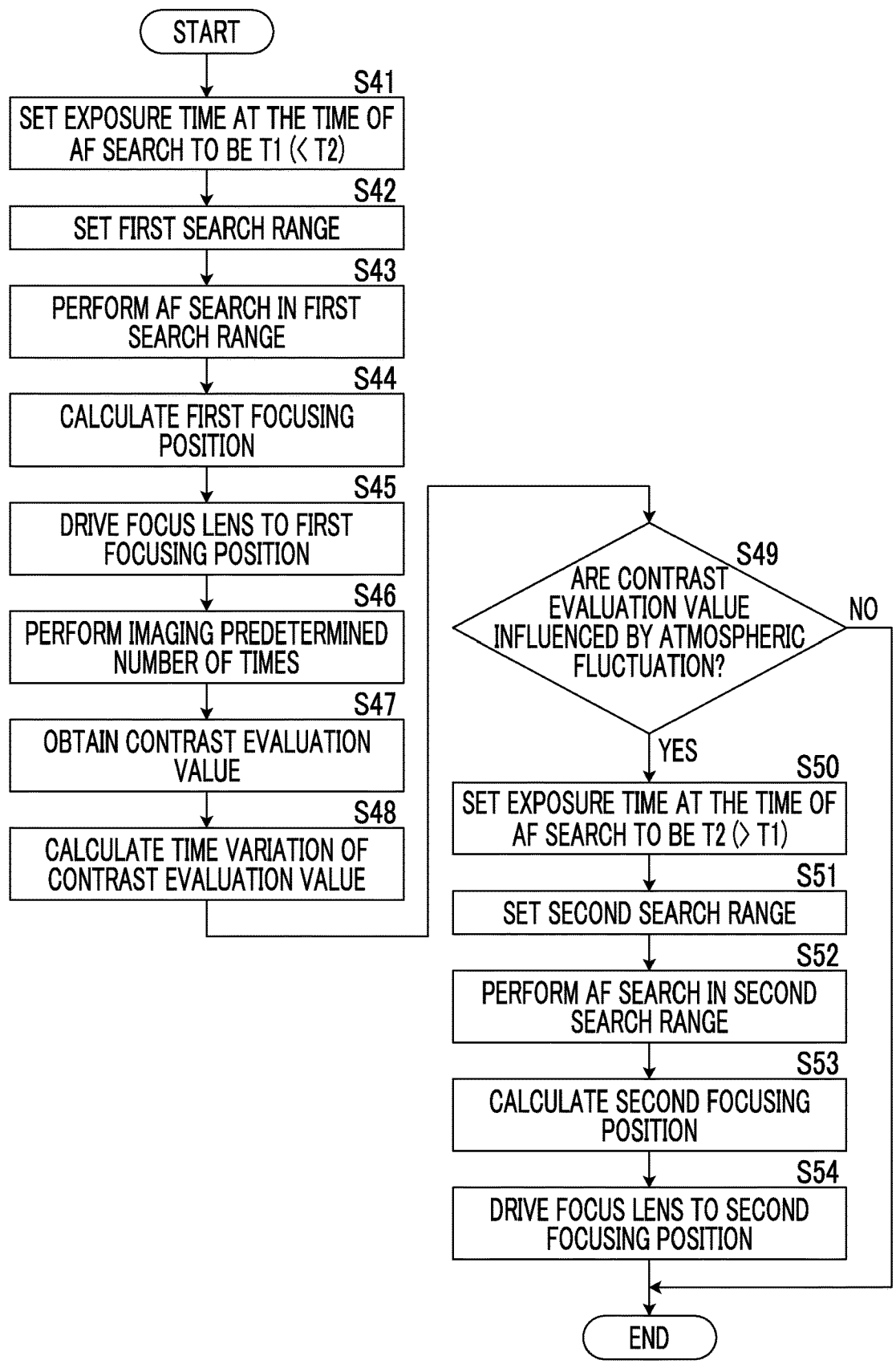
FIG. 9 is a flowchart for describing a flow of AF processing of the digital camera of FIG. 8.

Hereinafter, the AF processing including the focusing position detecting process in the digital camera 1-3 having the above-described configuration will be described in detail with reference to the drawings. FIG. 9 is a diagram showing a flowchart for describing a flow of the AF processing of the digital camera 1-3.

As shown in FIG. 9, the exposure time setting unit 46 sets the exposure time to be used in the imaging at the time of AF search to be T1 (<T2) (step S41), and the first search range is set by the user through the operation unit 26 (step S42). Here, the exposure time T1 is an exposure time in a case where there is no atmospheric fluctuation, that is, in a normal state, and the exposure time T2 is an exposure time in a case where there is the atmospheric fluctuation. The exposure time setting unit 46 sets the exposure time T2 so as to be longer than the exposure time T1. A value set for the digital camera 1-3 in advance may be used as the first search range. Similarly to the aforementioned embodiment, in the present embodiment, a range between INF, that is, a distance of infinity and MOD, that is, the shortest imaging distance is used as the first search range, as shown in FIG. 5.

Subsequently, the first focusing position calculating unit 52 causes the AF processing unit 32 to perform the AF search in the first search range (step S43). Similarly to the aforementioned embodiment, in the present embodiment, imaging is performed by 20 times in the first search range, as shown in FIG. 5. The first contrast evaluation value calculating unit 51 calculates the contrast evaluation values from the 20 image data items obtained through the AF search using the AF processing unit 32 by the aforementioned method, and the first focusing position calculating unit 52 calculates the first focusing position from the focus positions at the time of AF search and the contrast evaluation values calculated by the first contrast evaluation value calculating unit 51 (step S44).

Subsequently, the first focusing position calculated by the first focusing position calculating unit 52 is output to the AF processing unit 32, the AF processing unit 32 determines the focusing set value (focus driving amount) based on the first focusing position output from the first focusing position calculating unit 52 and outputs the focus driving amount data, and the focus lens drive unit 20a step-drives the focus lens 10a to the first focusing position based on the focus driving amount data output from the AF processing unit 32 (step S45).

Subsequently, the AF processing unit 32 causes the CCD 13 to obtain the plurality of image data items by imaging the subject a multiple number of times without changing the focus position in the first focusing position calculated by the first focusing position calculating unit 44 at the same exposure time T1 as that at the time of AF search in step S43 (step S46), and the second contrast evaluation value calculating unit 53 calculates the contrast evaluation values from the plurality of obtained image data items (step S47).

Subsequently, the time variation detecting unit 54 calculates the time variation of the plurality of contrast evaluation values calculated by the second contrast evaluation value calculating unit 53, that is, the difference between the maximum value and the minimum value by the above-described method (step S48), the determination unit 55 determines whether or not the contrast evaluation values are influenced by the atmospheric fluctuation from the detection result of the time variation using the time variation detecting unit 54 by the above-described determination method, and the process is ended while the focus lens 10a is set in the first focusing position in a case where the contrast evaluation values are not influenced by the atmospheric fluctuation (step S49; NO).

Meanwhile, in a case where the contrast evaluation values are influenced by the atmospheric fluctuation (step S49; YES), the exposure time setting unit 46 sets the exposure time to be used in the imaging at the time of AF search to be T2 (>T1) (step S50), and a second search range is set by the user through the operation unit 26 (step S51). Here, the exposure time T2 is set to be longer than the exposure time T1 by the exposure time setting unit 46. The second search range may be selected among a plurality of values set to the digital camera 1-3 in advance by the user through the operation unit 26. It is assumed that the second search range is set in a range which includes the first focusing position and includes evaluation values before and after the first focusing position by considering that a plurality of evaluation values is required in order to calculate the second focusing position, and it is assumed that a center of the second search range is the first focusing position as shown in FIG. 5 in the present embodiment. Specifically, the second search range is set so as to obtain the first focusing position as a reference and two points before and after the first focusing position, that is, five evaluation values.

Subsequently, the second focusing position calculating unit 57 causes the AF processing unit 32 to perform the AF search in the second search range (step S52). In the present embodiment, imaging is performed by five times within the second search range, as shown in FIG. 5. The third contrast evaluation value calculating unit 56 calculates the contrast evaluation values from the five image data items obtained through the AF search using the AF processing unit 32 by the above-described method, and the second focusing position calculating unit 57 calculates the second focusing position from the focus positions at the time of AF search and the contrast evaluation values calculated by the third contrast evaluation value calculating unit 56 (step S53). The second focusing position calculated by the second focusing position calculating unit 57 is output to the AF processing unit 32, the AF processing unit 32 determines the focusing set value (focus driving amount) based on the second focusing position output from the second focusing position calculating unit 57 and outputs the focus driving amount data, and the focus lens drive unit 20a step-drives the focus lens 10a to the second focusing position based on the focus driving amount data output from the AF processing unit 32 (step S54). As stated above, the digital camera 1-3 performs the AF processing.

In the digital camera 1-3 according to the present embodiment, after the first focusing position is calculated by performing the AF search in the first search range at the standard exposure time T1 in a case where there is no atmospheric fluctuation, the determination unit 55 determines whether or not there is the atmospheric fluctuation. Only in a case where it is determined that the contrast evaluation values are influenced by the atmospheric fluctuation, the second focusing position is calculated by setting the exposure time to be the exposure time T2 in a case where there is the atmospheric fluctuation, and performing the AF search in the second search range which includes the first focusing position and is narrower than the first search range. That is, only in a case where the contrast evaluation values are influenced by the atmospheric fluctuation, the AF search is performed by setting the exposure time so as to be the exposure time T2 longer than the standard exposure time T1 in a case where the atmospheric fluctuation is not detected. Thus, only in a case where the calculated contrast evaluation values are influenced by the atmospheric fluctuation, the AF search is performed again, and unnecessary AF search is not performed. Accordingly, it is possible to reduce a time required for AF search. That is, it is possible to suppress an increase in time of the AF search caused by setting the exposure time at the time of AF search in a case where it is determined that the contrast evaluation values are influenced by the atmospheric fluctuation to be longer than the set exposure time, that is, the standard exposure time at the time of AF search.

Although it has been described in the present embodiment that the AF search in the first search range and the AF search in the second search range have the same interval of the number of times of adjacent searches, that is, the same search width, a search width in the second search range may be set so as to be shorter than the search width in the first search range as shown in FIG. 7, as in the aforementioned embodiment.

The search width in the second search range is set so as to be shorter than the search width in the first search range, and thus, it is possible to suppress an increase in time of the AF search caused by setting the exposure time at the time of AF search in a case where it is determined that the contrast evaluation values are influenced by the atmospheric fluctuation so as to be longer than the set exposure time, that is, the standard exposure time at the time of AF search. Further, since it is possible to increase the number of times of searches by shortening the search width, it is possible to calculate many contrast evaluation values from the image data items captured at the exposure time at the time of AF search in a case where it is determined that there is the atmospheric fluctuation. Thus, it is possible to more accurately detect the focusing position corresponding to the peak value of the contrast evaluation values.

As a factor of the disorder of the contrast evaluation values in addition to the atmospheric fluctuation, a case where the subject is an animal is considered. In this case, since the variation of the contrast evaluation values caused by the movement of the subject is much larger than the variation of the contrast evaluation values caused by the atmospheric fluctuation, the animal is detected before the AF search is performed, and it is not necessary to increase the exposure time in a case where there is the animal. Thus, it is preferable that the process of step S46 and the subsequent processes of FIG. 9 are not performed.

The focusing position detecting device according to the present invention is not limited to the aforementioned embodiments, and may be appropriately changed without departing from the gist of the invention.

EXPLANATION OF REFERENCES 1, 1-2, 1-3: digital camera
100, 100-2, 100-3: focusing position detecting device 10: imaging lens
10a: focus lens
10b: zoom lens
11: stop
12: shutter
13: CCD
14: analog signal processing unit
15: flash
20a: focus lens drive unit (drive unit)
20b: zoom lens drive unit
21: stop drive unit
22: shutter drive unit
23: CCD drive unit
24: timing generator
25: flash controller
26: operation unit
27: release button
30: CPU
31: image input controller
32: AF processing unit
33: AE processing unit
34: AWB processing unit
35: compression/decompression processing unit
36: frame memory
37: media controller
38: external recording media
39: display controller
40: liquid crystal monitor
41: image signal processing unit
42: internal memory
43: contrast evaluation value calculating unit
44: focusing position detecting unit
45: detection unit
46: exposure time setting unit
47: standard contrast evaluation value calculating unit
48: first focusing position detecting unit
49: fluctuation contrast evaluation value calculating unit
50: second focusing position detecting unit
51: first contrast evaluation value calculating unit
52: first focusing position detecting unit
53: second contrast evaluation value calculating unit
54: time variation detecting unit
55: determination unit
56: third contrast evaluation value calculating unit
57: second focusing position detecting unit
60: data bus
T1, T2: exposure time
Thres: determination threshold value
Vmax: maximum contrast evaluation value
Vmin: minimum contrast evaluation value

What is claimed is:

1. A focusing position detecting device as a part of an electronic device having an electronic imaging function comprising contrast evaluation value calculating unit configured to calculate contrast evaluation values from a plurality of image data items obtained by imaging a subject a multiple number of times at a set exposure time while moving a focus lens in an optical axis direction within a search range, and focusing position calculating unit configured to calculate a focusing position from focus positions at the time of imaging the subject a multiple number of times and the contrast evaluation values calculated by the contrast evaluation value calculating unit, the device comprising:
   detection unit configured to detect atmospheric fluctuation; and
   exposure time setting unit configured to set an exposure time in a case where the detection unit detects the atmospheric fluctuation so as to be longer than an exposure time in a case where the detection unit does not detect the atmospheric fluctuation;
   wherein the atmospheric fluctuation is at least one selected from the group consisting of change in heat haze, change in wind and change in temperature.

2. The focusing position detecting device according to claim 1, further comprising:
   standard contrast evaluation value calculating unit configured to calculate contrast evaluation values from a plurality of image data items obtained by imaging the subject a multiple number of times at an exposure time in a case where the atmospheric fluctuation is not detected while moving the focus lens in the optical axis direction within a first search range;
   first focusing position calculating unit configured to calculate a first focusing position from focus positions at the time of imaging the subject a multiple number of times by the standard contrast evaluation value calculating unit and the contrast evaluation values calculated by the standard contrast evaluation value calculating unit;
   fluctuation contrast evaluation value calculating unit configured to calculate contrast evaluation values from a plurality of image data items obtained by imaging the subject a multiple number of times at an exposure time in a case where the detection unit detects the atmospheric fluctuation while moving the focus lens within a second search range which includes the first focusing position and is narrower than the first search range in the optical axis direction in a case where the detection unit detects the atmospheric fluctuation; and
   second focusing position calculating unit configured to calculate a focusing position from focus positions at the time of imaging the subject a multiple number of times by the fluctuation contrast evaluation value calculating unit and the contrast evaluation values calculated by the fluctuation contrast evaluation value calculating unit.

3. The focusing position detecting device according to claim 2,
   wherein a search width in the fluctuation contrast evaluation value calculating unit is shorter than a search width in the standard contrast evaluation value calculating unit.

4. A focusing position detecting device as a part of an electronic device having an electronic imaging function comprising:
   first contrast evaluation value calculating unit configured to calculate contrast evaluation values from a plurality of image data items obtained by imaging a subject a multiple number of times at a set exposure time while moving a focus lens in an optical axis direction within a first search range;
   first focusing position calculating unit configured to calculate a first focusing position from focus positions at the time of imaging the subject a multiple number of times and the calculated contrast evaluation values in the first contrast evaluation value calculating unit;
   drive unit configured to drive the focus lens in the first focusing position;
   second contrast evaluation value calculating unit configured to calculate contrast evaluation values from a plurality of image data items obtained by imaging the subject a multiple number of times at the set exposure time in the first focusing position;

time variation detecting unit configured to detect a time variation in a plurality of the contrast evaluation values calculated by the second contrast evaluation value calculating unit;

determination unit configured to determine whether or not the contrast evaluation values are influenced by atmospheric fluctuation from the detection result of the time variation;

exposure time setting unit configured to set an exposure time so as to be longer than the set exposure time in a case where it is determined that the contrast evaluation values are influenced by the atmospheric fluctuation;

third contrast evaluation value calculating unit configured to calculate contrast evaluation values from a plurality of image data items obtained by imaging the subject a multiple number of times at the exposure time set by the exposure time setting unit while moving the focus lens within a second search range which includes the first focusing position and is narrower than the first search range in the optical axis direction in a case where it is determined that the contrast evaluation values are influenced by the atmospheric fluctuation; and second focusing position calculating unit configured to calculate a second focusing position from focus positions at the time of imaging the subject a multiple number of times and the calculated contrast evaluation values in the third contrast evaluation value calculating unit.

5. The focusing position detecting device according to claim 2,
wherein a central position of the second search range is set in the first focusing position.

6. The focusing position detecting device according to claim 3,
wherein a central position of the second search range is set in the first focusing position.

7. The focusing position detecting device according to claim 4,
wherein a central position of the second search range is set in the first focusing position.

8. The focusing position detecting device according to claim 4,
wherein a search width in the third contrast evaluation value calculating unit is shorter than a search width in the second contrast evaluation value calculating unit.

9. The focusing position detecting device according to claim 7,
wherein a search width in the third contrast evaluation value calculating unit is shorter than a search width in the second contrast evaluation value calculating unit.

10. A focusing position detecting method executed by an electronic device having an electronic imaging function comprising a contrast evaluation value calculating step of calculating contrast evaluation values from a plurality of image data items obtained by imaging a subject a multiple number of times at a set exposure time while moving a focus lens in an optical axis direction within a search range, and a focusing position calculating step of calculating a focusing position from focus positions at the time of imaging the subject a multiple number of times and the calculated contrast evaluation values, the method comprising:

a detection step of detecting atmospheric fluctuation; and
an exposure time setting step of setting an exposure time in a case where the atmospheric fluctuation is detected so as to be longer than an exposure time in a case where the atmospheric fluctuation is not detected;

wherein the atmospheric fluctuation is at least one selected from the group consisting of change in heat haze, change in wind and change in temperature.

11. The focusing position detecting method according to claim 10, further comprising:

a standard contrast evaluation value calculating step of calculating contrast evaluation values from a plurality of image data items obtained by imaging the subject a multiple number of times at an exposure time in a case where the atmospheric fluctuation is not detected while moving the focus lens in the optical axis direction within a first search range;

a first focusing position calculating step of calculating a first focusing position from focus positions at the time of imaging the subject a multiple number of times in the standard contrast evaluation value calculating step and the calculated contrast evaluation values;

a fluctuation contrast evaluation value calculating step of calculating contrast evaluation values from a plurality of image data items obtained by imaging the subject a multiple number of times at an exposure time in a case where the atmospheric fluctuation is detected while moving the focus lens within a second search range which includes the first focusing position and is narrower than the first search range in the optical axis direction in a case where the atmospheric fluctuation is detected; and a second focusing position calculating step of calculating a second focusing position from focus positions at the time of imaging the subject a multiple number of times in the fluctuation contrast evaluation value calculating step and the calculated contrast evaluation values.

12. The focusing position detecting method according to claim 11,
wherein a search width in the fluctuation contrast evaluation value calculating step is shorter than a search width in the standard contrast evaluation value calculating step.

13. A focusing position detecting method executed by an electronic device having an electronic imaging function comprising:

a first contrast evaluation value calculating step of calculating contrast evaluation values from a plurality of image data items obtained by imaging a subject a multiple number of times at a set exposure time while moving a focus lens in an optical axis direction within a first search range;

a first focusing position calculating step of calculating a first focusing position from focus positions at the time of imaging the subject a multiple number of times and the calculated contrast evaluation values in the first contrast evaluation value calculating step;

a drive step of driving the focus lens in the first focusing position;

a second contrast evaluation value calculating step of calculating contrast evaluation values from a plurality of image data items obtained by imaging the subject a multiple number of times at the set exposure time in the first focusing position;

a time variation detecting step of detecting a time variation in a plurality of the contrast evaluation values calculated in the second contrast evaluation value calculating step;

a determination step of determining whether or not the contrast evaluation values are influenced by atmospheric fluctuation from the detection result of the time variation;

an exposure time setting step of setting an exposure time so as to be longer than the set exposure time in a case where it is determined that the contrast evaluation values are influenced by the atmospheric fluctuation;

a third contrast evaluation value calculating step of calculating contrast evaluation values from a plurality of image data items obtained by imaging the subject a multiple number of times at the exposure time set in the exposure time setting step while moving the focus lens within a second search range which includes the first focusing position and is narrower than the first search range in the optical axis direction in a case where it is determined that the contrast evaluation values are influenced by the atmospheric fluctuation; and a second focusing position calculating step of calculating a second focusing position from focus positions at the time of imaging the subject a multiple number of times and the calculated contrast evaluation values in the third contrast evaluation value calculating step.

14. The focusing position detecting method according to claim 11,
wherein a central position of the second search range is set in the first focusing position.

15. The focusing position detecting method according to claim 12,
wherein a central position of the second search range is set in the first focusing position.

16. The focusing position detecting method according to claim 13,
wherein a central position of the second search range is set in the first focusing position.

17. The focusing position detecting method according to claim 13,
wherein a search width in the third contrast evaluation value calculating step is shorter than a search width in the second contrast evaluation value calculating step.

18. The focusing position detecting method according to claim 16,
wherein a search width in the third contrast evaluation value calculating step is shorter than a search width in the second contrast evaluation value calculating step.

* * * * *